United States Patent [19]

Mengotti et al.

[11] Patent Number: 5,018,336

[45] Date of Patent: May 28, 1991

[54] SYSTEM AND PROCESS FOR PRODUCING OR TREATING CYLINDRICAL ARTICLES AND APPARATUS EMPLOYABLE THEREIN

[75] Inventors: Giovanni Mengotti; Italo Pacchioni, both of Vicenza, Italy

[73] Assignee: Umberto Bastianello, Vicenza, Italy

[21] Appl. No.: 442,982

[22] Filed: Nov. 28, 1989

[30] Foreign Application Priority Data

Nov. 28, 1988 [IT] Italy .................................. 3676 A/88
Jun. 16, 1989 [IT] Italy .............................. 45742 A/89
Jun. 23, 1989 [IT] Italy .............................. 45746 A/89
Jun. 28, 1989 [IT] Italy .............................. 45749 A/89

[51] Int. Cl.[5] ...................... B65B 35/10; B65B 57/14
[52] U.S. Cl. ..................................... 53/435; 53/167;
53/251; 198/372; 493/274; 493/288
[58] Field of Search .............. 493/274, 269, 287, 288;
53/202, 167, 168, 252, 251, 250, 249, 435;
198/372, 369

[56] References Cited

U.S. PATENT DOCUMENTS

| | | | |
|---|---|---|---|
| 3,924,381 | 12/1975 | Sardo | 53/167 X |
| 4,021,992 | 5/1977 | Spaude et al. | 53/167 X |
| 4,057,138 | 11/1977 | Grebe | 198/372 |
| 4,121,403 | 10/1978 | Bogdanski et al. | 53/202 |
| 4,217,745 | 8/1980 | Watzka | 53/202 X |
| 4,525,978 | 7/1985 | Hayase et al. | 53/167 |
| 4,628,665 | 12/1986 | Herrington | 53/252 |
| 4,821,865 | 4/1989 | Hirata et al. | 198/372 X |

FOREIGN PATENT DOCUMENTS 239499 9/1987 European Pat. Off. ............ 198/372

Primary Examiner—James F. Coan
Attorney, Agent, or Firm—Wenderoth, Lind & Ponack

[57] ABSTRACT

The production or treatment of articles, particularly cylindrical support cops, involves the transportation of the articles between an upstream station and a downstream station, with the speed of supply of the articles from the upstream station being greater than the speed of operation of the downstream station. This is overcome by the provision of a plurality of the downstream stations. Provided between the upstream station and the plurality of downstream stations is an article distributing system operable to distribute the articles to any of the plurality of downstream stations. The distributing system is operated to selectively distribute the articles to the plurality of downstream stations as a function of the operating conditions thereof.

73 Claims, 12 Drawing Sheets

SYSTEM AND PROCESS FOR PRODUCING OR TREATING CYLINDRICAL ARTICLES AND APPARATUS EMPLOYABLE THEREIN

BACKGROUND OF THE INVENTION

The present invention relates to a system and process for producing or treating cylindrical articles and also to an apparatus employable in such system and process. More particularly, the present invention relates to such a system, process and apparatus involved in the production or manufacture of cylindrical supports, hereinafter referred to as cops, for reels or cones of yarn, etc., used in the textile industry.

The production of such cylindrical supports or cops currently is achieved by a manufacturing process essentially including the following four basic manufacturing steps:

1) production of a basic, unfinished tube, normally of cardboard;
2) drying such tube;
3) cutting the tubes cut-to-length; and
4) finishing and trimming.

Special spiral winding machines produce the tubes in continuous pieces having different sizes and wall thicknesses in accordance with particular production needs. Such semi-finished tubes then are cut into several equally sized tubes having a length of approximately 120 to 130 cm, which then are loaded by hand into containers that then are brought to drying equipment to dry or set-up glue applied previously by the winding step. Such drying equipment may be of the chamber or tunnel type, while the holding time in such drying equipment varies according to the wall thickness and type of materials employed in forming the cops. After such drying step, the tubes are carried to a cutter where the dried tubes are cut to their final length according to the actual size requirements, that usually call for a length ranging from approximately 100 to approximately 300 mm. After this cutting-to-length operation, an automatic device transfers the cut-to-length tubes or cops to a "finishing" or "trimming" machine which performs finishing operations on the outer surface and opposite ends of the tubes, or to a boxing or packaging machine. The final trimming or finishing step is necessary to achieve the final characteristics of the product itself, and particularly is employed to provide the final product with required centering marks, yarn fastening slots, as well as rounded end edges of the finished cops. These operations usually are carried out by a finishing and trimming machine, hereinafter simply referred to as trimming machine, although such machine also can achieve boxing or cartoning of the finished cops.

The conventional feed system used to load the trimming machine achieves transfer of one cop at a time by means of a relatively small pneumatic system, i.e. a piston-cylinder arrangement. The use of such a pneumatic system, although ensuring high reliability of transfer of the cops, does not enable high feed rates to be obtained. This is due to the fact that the operation of the piston during each feed cycle includes a backward stroke that does not contribute to feeding. As a result, the highest obtainable feeding rate for such a system cannot exceed approximately 100 to 120 articles per minute.

Therefore, currently employed processes and systems for manufacturing cylindrical cops are rigid and inflexible. As a direct result thereof, and due to the fact that all of the various above described machines normally are arranged in series, i.e. in sequence along a single production line, the highest possible production rate of the entire line cannot exceed the rate of operation of the slowest machine in the line, i.e. normally the trimming machine. In other words, the production rate and efficiency of conventional production lines are limited by the rate of operation of and feed to the trimming machine.

Under practical production conditions and requirements however, the need frequently arises for manufacturing cops of widely varying sizes, i.e. of different lengths, diameters and wall thicknesses. As a result, there seldom occurs a situation that the entire production line can be fully efficiently saturated in all portions and functions thereof, i.e. all of the winding machine, drying machine, cutting machine and trimming machine being operated to capacity at the same time. Therefore, the conventional system inherently involves poor utilization of production capacity due to the practical impossibility of exploiting the full output capabilities of all of the machines of the production line. This inevitably results in an increased unit cost of each of the several types of cops that need to be produced on the production line.

Another factor substantially increasing the unit cost of the cops results from the time that inevitably is wasted when it is necessary to set-up the production line for accommodating new models or versions of the product. In other words, the down time required when the need arises to change the machines of the production line from one model of cop to another may be as high as four to six hours for the trimming machine, while the remaining machines of the continuous production line can be set-up and adjusted to the new requirements in a much shorter time, for example approximately 30 minutes to adjust the winding and wrapping machine to a new size and thickness of the tube and of the cutting machine to cut a different length of the cops. Therefore, down time of the production line in such situations substantially is primarily due to the need for setting up and adjusting the trimming machine to the characteristics of the new product. This generally is due to the fact that the trimming machine is the most complex machine in the production line, due to the numerous trimming operations that it is required to perform.

Thus, the typical and inherent disadvantages of current manufacturing systems and processes for the production of cylindrical supports or cops are the following:

1) The conventional production line is a rigid, single-model line including various machines arranged in series in a sequential arrangement, and as a result the manufacture of products with different final characteristics and initiating from a single feeding line is impractical;

2) The production output rate of the conventional production is limited by the rate of operation of the final trimming machine which normally is fed by pneumatic means;

3) The conventional production line requires substantial set-up times for product model changes. This disadvantage is accentuated by the fact that the actual set-up time necessary for the most complex machine again is the final trimming machine. As a consequence, the resultant very long down times of the entire production line considerably effect both direct and indirect manufacturing costs.

SUMMARY OF THE INVENTION

With the above discussion in mind, it is an object of the present invention to provide a system and process for the production or treatment of articles, particularly cylindrical articles, more particularly cylindrical supports or cops for the textile industries, whereby it is possible to overcome the above and other prior art disadvantages.

It is a further object of the present invention to provide an improved apparatus for use in such system and process.

It is a more specific object of the present invention to provide such a system, process and apparatus that make it possible to provide a production line that is more flexible and capable of faster operation, both with regard to production output rates and set-up times for model changes.

It is a yet further object of the present invention to provide such a system, process and apparatus capable of such improved performance without the need for special, expensive equipment, but rather by the use of known commonly available machines.

These objects are achieved in accordance with the present invention by the provision of a system and process for the production or treatment of articles, particularly cylindrical articles, further particularly cylindrical supports or cops, wherein the articles are transported between an upstream station and a downstream station and wherein the speed of supply of the articles from the upstream station is greater than the speed of operation of the downstream station. It is particularly contemplated that the upstream station may be the cutting-to-length machine and the downstream station may be the trimming machine. It is also is contemplated that the upstream station may be the trimming machine and the downstream station may be a packaging or cartoning machine. Other combinations however are possible within the scope of the present invention. The improvement of the present invention involves the provision of a plurality of the downstream stations. Additionally, there is provided, between the upstream station and the plurality of downstream stations, an article distributing system operable to distribute the articles from the upstream station to any of the plurality of downstream stations. The article distributing system is operated to selectively distribute the articles to various of the plurality of downstream stations as a function of the operating conditions thereof. For example, the article distributing system may supply the articles to one of the downstream stations and, when such one downstream station reaches its capacity, the article distributing system may be changed to thereafter distribute the articles to another of the downstream stations. Alternatively, the article distributing system may distribute the articles selectively to the downstream stations as a function of different treatments to be performed on the articles by different of the downstream stations.

The apparatus of the present invention involves specific structures of the article distributing system.

BRIEF DESCRIPTION OF THE DRAWINGS

Other objects, features and advantages of the present invention will be apparent from the following detailed description of preferred embodiments thereof, with reference to the accompanying drawings, wherein.

DETAILED DESCRIPTION OF THE INVENTION

Figure 1:
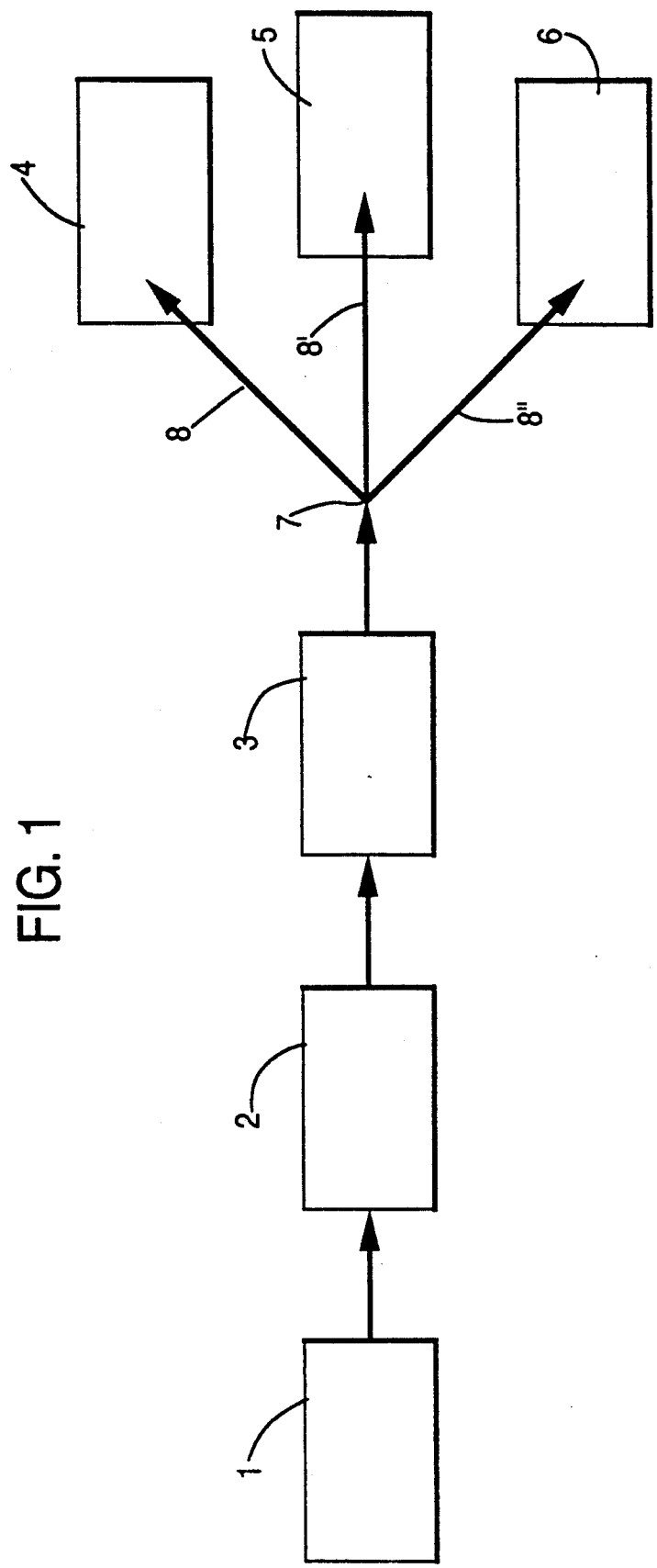
FIG. 1 is a schematic view of a system and illustrating a process according to one embodiment of the present invention.

FIG. 1 schematically shows a system in accordance with one embodiment of the present invention for manufacturing cylindrical cops. Specifically, schematically shown in FIG. 1 is a production line including a series sequential arrangement of a conventional winding and wrapping machine 1, a conventional drying oven 2, and a conventional cutting-to-length machine 3. A known production line would have downstream of machine 3 a single trimming machine. In accordance with the present invention however, there are provided a plurality of trimming machines 4, 5, 6. All of machines 1-6 are intended to be conventional and may include any such machines known in the art.

In further accordance with the present invention there is provided between an upstream station, i.e. machine 3, and the plurality of downstream stations, i.e. machines 4-6, for example at a sorting position or station 7, an article distributing means in the form of handling means for selectively distributing articles discharged from machine 3 to any or various of the plurality of downstream stations or machines 4-6. This distribution is achieved as a function of the operating conditions of machines 4-6.

Figure 3:
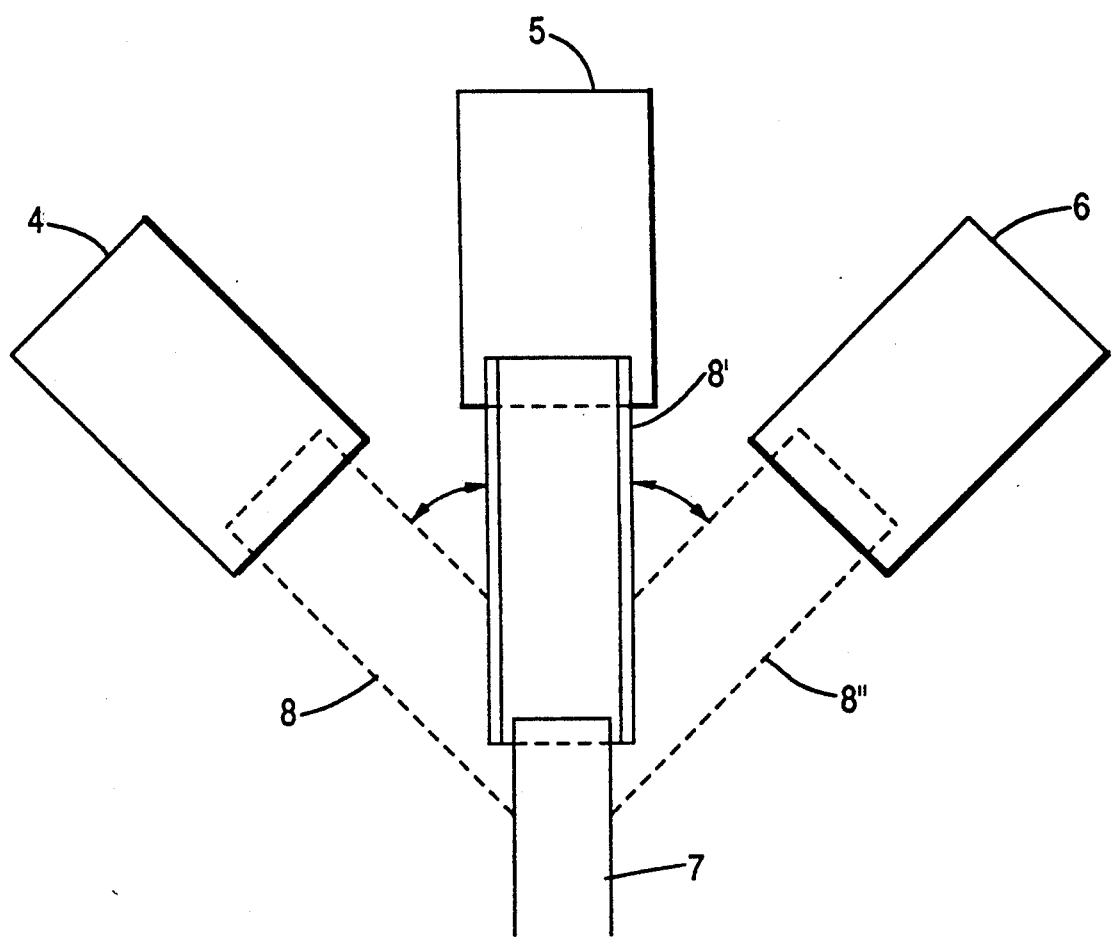
FIG. 3 is a more detailed but still schematic view involved in the embodiment illustrated in FIG. 1.
Figure 4:
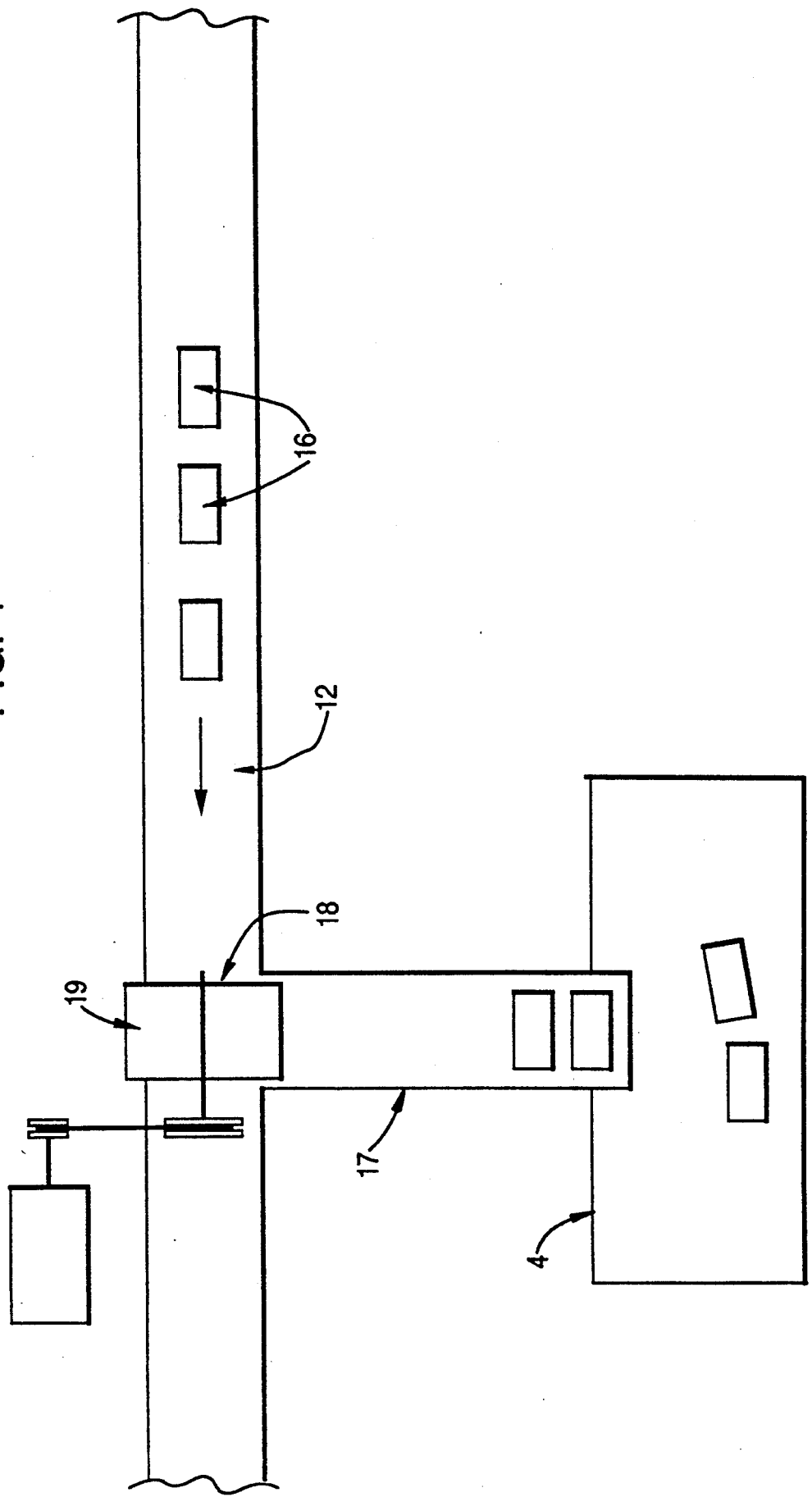
FIG. 4 is a schematic view of an apparatus employable in the embodiment of FIG. 2.

For example, the handling means may be a chute-like member, as illustrated in FIG. 3, or alternatively could be a conveyor. When the handling means is in the solid line position shown at 8' in FIG. 3, articles received from machine 3 automatically are passed from station 7 by the handling means to machine 5. Alternatively, it would be possible to provide a feeding apparatus, as would be understood in the art, at station 7 to achieve automatic regulated feed of the articles to the handling means and then to machine 5.

The present invention is based on the assumption that trimming machine 5 has the lowest output of the production line. Accordingly, the output rate of articles fed to machine 5 will be higher than the capacity of operation thereof, and eventually the inlet or buffering line of machine 5 will be saturated, for example in a relatively short period of time. This condition will be detected, by a structure discussed in more detail below, and as a result a signal will be sent to the handling means to cause such handling means to be moved to a new position, for example position 8' supplying machine 4 or position 8" supplying machine 6. Thereafter, such new machine also will be saturated with articles, and the handling means again may be moved to position aligned with a different of the machines. It of course would be possible to provide sequential realignment of the handling means from position 8' to position 8" or vice versa. This however may be achieved in accordance with a preprogrammed sequence.

This system and process in accordance with the present invention make it possible to maintain the entire production line operating regularly and at capacity, even if not all of the trimming machines are operative at the same time. Thus, it is possible to place one or more of the trimming machines temporarily out of operation, for instance for set-up, maintenance, repair or other purposes, without impairing the efficiency and productivity of the remainder of the production line. Additionally, the overall productivity of the entire production line is substantially increased since its overall output rate, previously limited to the maximum rate of a single trimming machine, now is equal to the sum of the production rates of all of the trimming machines. Even further, it is not necessary to provide that all of the machines operate in synchronism, particularly between machine 3 and the trimming machines, and also among the trimming machines themselves. In other words, it is possible that trimming machines 4-6 may be different machines operable at different rates. The practical advantage of this feature is that it is possible to employ trimming machines of an older type that still are in good condition, but which otherwise would be considered obsolete due to low operating rate and which otherwise would have to be replaced. A further and very important advantage of this arrangement is that it now is possible to manufacture more than one type of cop per production run. This was not possible in conventional systems employing a single trimming machine due to the very long set-up time of trimming machines. Now however it is possible to set-up plural or all of the trimming machines for production of different cops, and a single type of semi-finished product may be finalized into different finished products by the different trimming machines. This achieves much more flexible planning with regard to production scheduling, inventories, minimum production lots and delivery dates than was possible in the past.

Figure 2:
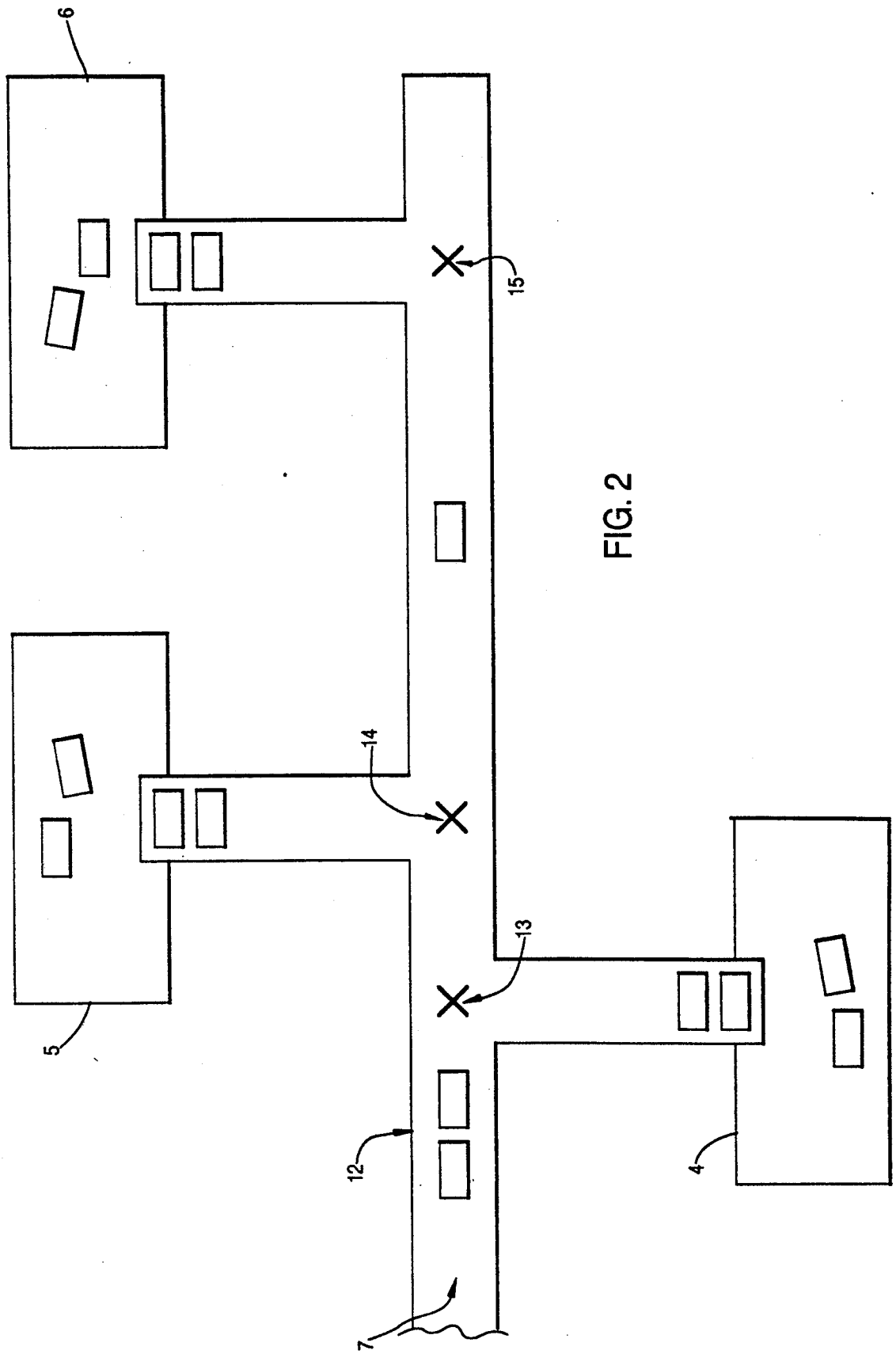
FIG. 2 is a similar schematic view of another embodiment of the present invention.

FIG. 2 illustrates a modified arrangement for transferring the cops from upstream machine 3 to a plurality of downstream machines 4-6. Thus, whereas in the embodiment of FIGS. 1 and 3 the downstream trimming machines are arranged in a radial array around the upstream station or sorting station, in the embodiment of FIG. 2 the plurality of trimming machines or downstream stations 4-6 are provided at respective positions spaced along a conveyor 12 extending from the upstream station or sorting station 7. The distributing system comprises handling means located at respective intermediate stations 13, 14, 15 along conveyor 12 at respective positions of the plurality of trimming machines 4-6. The handling means is operable to move a given article from conveyor 12 at the respective intermediate station 13-15 to the respective downstream trimming machine 4-6 or to allow a given article at such respective intermediate station to be moved by conveyor 12 further downstream beyond such respective intermediate station to another intermediate station. The structure of the handling means will be discussed in more detail below.

It will be apparent that the arrangement of FIG. 2 conceptually is similar to the arrangement of FIGS. 1 and 3. Indeed, if the intermediate stations 13-15 in FIG. 2 were to be arranged at a single station, such as station 7 in FIGS. 1 and 3, the result would be the arrangement of FIGS. 1 and 3. Nevertheless, the arrangement of FIG. 2 has an advantage that the number of downstream stations that can be fed is greater. Thus, the arrangement of FIGS. 1 and 3 is limited with regard to the number of possible downstream stations due to the radial array thereof. The number of downstream stations that is possible also is limited by the characteristics of the transfer or conveying apparatus available for transfer from sorting station 7. However, in the arrangement of FIG. 2 it is possible to employ a very large number of downstream stations, regardless of the characteristics of the transfer or conveying apparatus.

On the other hand, the embodiment of FIGS. 1 and 3 has the advantage compared to the embodiment of FIG. 2 that, in the embodiment of FIG. 2 it is necessary to establish the intermediate stations 13-15, and at such stations there must be structure capable of intercepting and catching with high rapidity and precision the moving cops, conveying them in due sequence without omitting any of them and according to a precisely predetermined timing toward the desired downstream stations. The technique employed in the prior art for such interception and conveyance involves the use of pneumatically driven pistons for transferring the cops from the handling means toward the downstream station, i.e. toward the respective trimming machine or toward the respective cartoning or packaging machine. Such pneumatic system has proven to be reliable and economical and thus commonly is employed for transfer of articles. However, the use of such a pneumatic system is, as discussed above, limited in operating rate due to the necessary wasted backstroke movement of the piston during each conveying operation. Therefore, such pneumatic system would not be able to handle at a satisfactory rate all of the cops supplied along conveyor 12.

Therefore, in accordance with a further feature of the present invention there is provided a novel handling apparatus at each of the intermediate stations 13-15. Such handling apparatus is reliable and economical and is capable of ensuring highly rapid operation, i.e. a high handling rate, even though it is of a particularly simple design. Such handling apparatus is illustrated in FIGS. 4-7.

Figure 5:
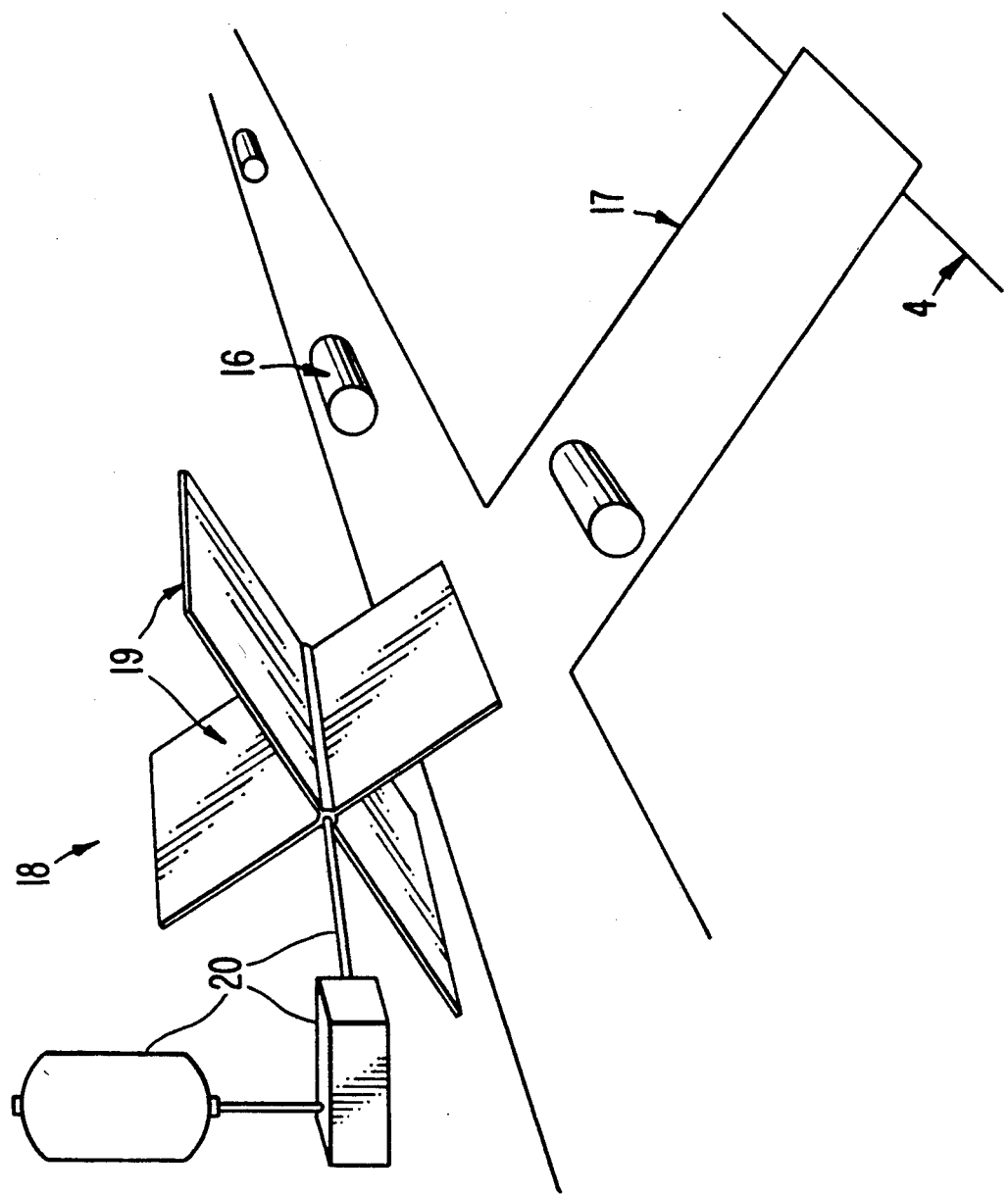
FIG. 5 is a schematic perspective view of the apparatus of FIG. 4.
Figure 6:
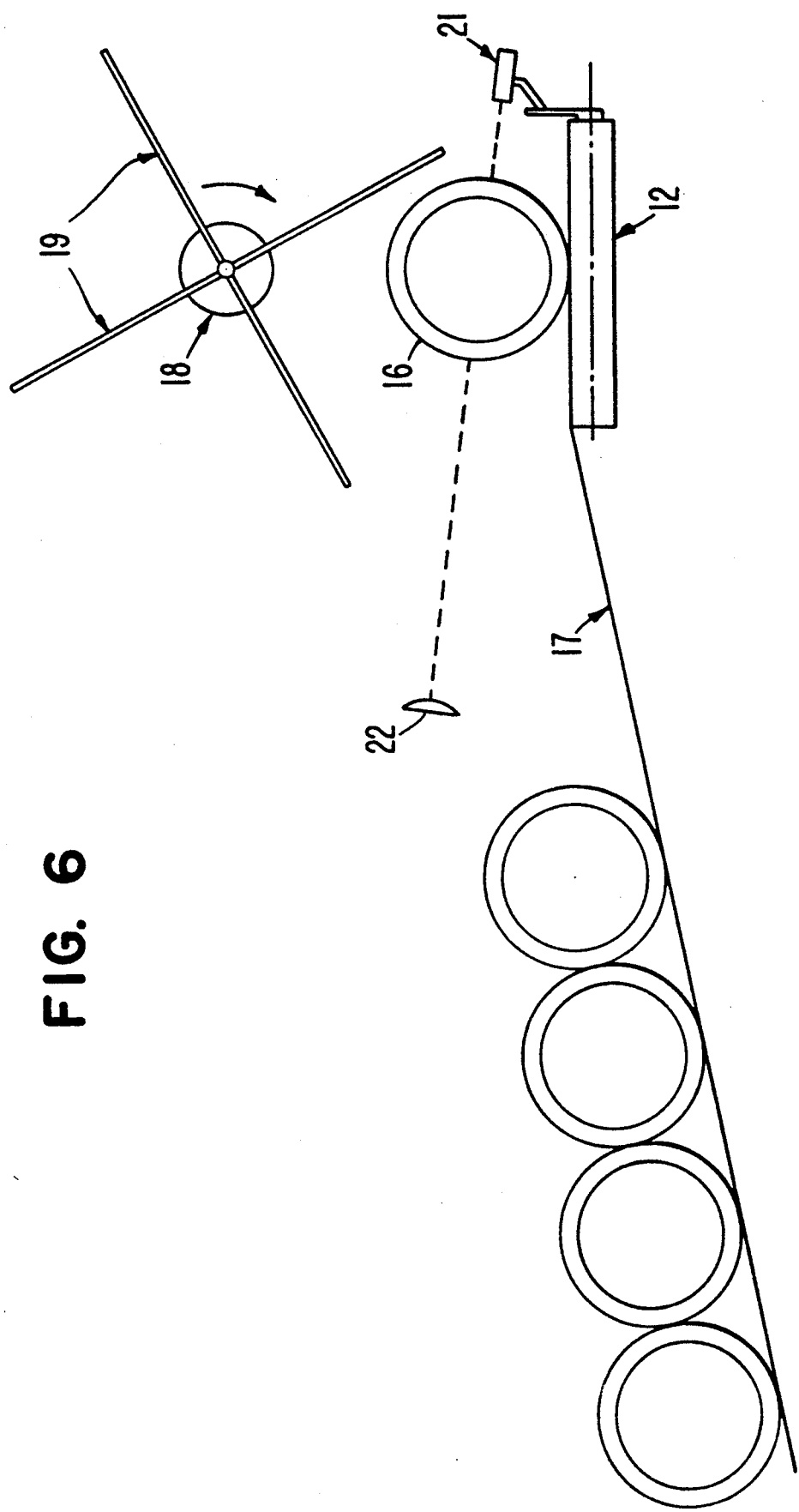
FIG. 6 is a schematic side view thereof.

Thus, the handling or transfer apparatus 18 is a wheel-like member located above conveyor 12 and rotatable about an axis extending substantially parallel to the direction of conveyance of conveyor 12. Apparatus 18 has a plurality of outwardly extending arms 19 dimensioned to, upon rotation about the axis, intercept articles 16 on conveyor 12 and to transfer such articles along a ramp or chute 17 to the respective downstream station, for example to trimming machine 4. In this regard, it is contemplated that the downstream station can be, as discussed above, a cartoning or packaging machine. Thus, arms 19 have surfaces that contact the tubular cops 16 and displace them from longitudinally moving conveyor 12. The arms are spaced circumferentially about the axis of the wheel-like member by a distance to allow passage between two adjacent arms of a cop 16 when the wheel-like member is not rotated and when it is positioned as illustrated in FIG. 5. Apparatus 18 is driven by a motor 20 through a coupling means, for example a clutch-brake assembly actuated by a control device. With particular reference to FIG. 6, position sensors, for example photoelectric cells 21, 22, are positioned above conveyor 12 to detect the movement of a cop 16 to the intermediate station adjacent the handling apparatus 18. It is to be understood that the spacing between adjacent cops 16 will not necessarily be constant. When sensor assembly 21, 22 detects the presence of a cop, it sends a command, for example through a servomechanism, to cause the motor to rotate the wheel-like member 18 by an angle sufficient to discharge the detected cop from conveyor 12 to ramp 17 as well as by such further angle to clear the space on conveyor 12 for the next cop to freely pass thereinto. When the next cop reaches the position of the sensor 21, 22, this process is repeated again. Thus, operation of apparatus 18 to discharge the cops from conveyor 12 is conducted automatically, even if the spacing between adjacent cops is not constant.

When the manufacturing rate increases upstream of the downstream stations, an event quite possible in the current state of the art, then of course the rate of movement of the cops along conveyor 12 will increase. Therefore, it will be necessary that the rate at which the cops are ejected from the conveyor to the trimming or cartoning machine be increased. This is possible in accordance with the present invention due to its particular characteristics of design, operation, rapidity, reliability and economy of operation. Thus, it is possible in accordance with the present invention that the handling apparatus operate at very high rates of up to several hundred cop discharge operations per minute. In fact is desirable that the cops themselves always be separate from each other, i.e. spaced on conveyor 12, so that they will not interfere with each other when they are ejected from the conveyor. For such spacing to be achieved however, the cops must be able to move at a high speed for a given rate of supply. This is due to the following equation:

$$v = (s + So)/t$$

where:
  v = moving speed of the cops
  s = distance between a given cop and a subsequent cop
  So = length of each single cop
  t = time between a given cop and a subsequent cop It therefore is apparent that, if the rate is to be increased and as a consequence the time t is to be decreased while maintaining an adequate spacing s between cops, it is necessary to increase the moving speed v of the cops. This does not provide problems in the current state of the art. It therefore is possible to take full advantage of the potential capabilities of the apparatus of the present invention that can perform at operating rates of up to several hundred strokes per minute while maintaining a satisfactory spacing between cops by simply increasing the moving speed of conveyor 12.

Figure 7:
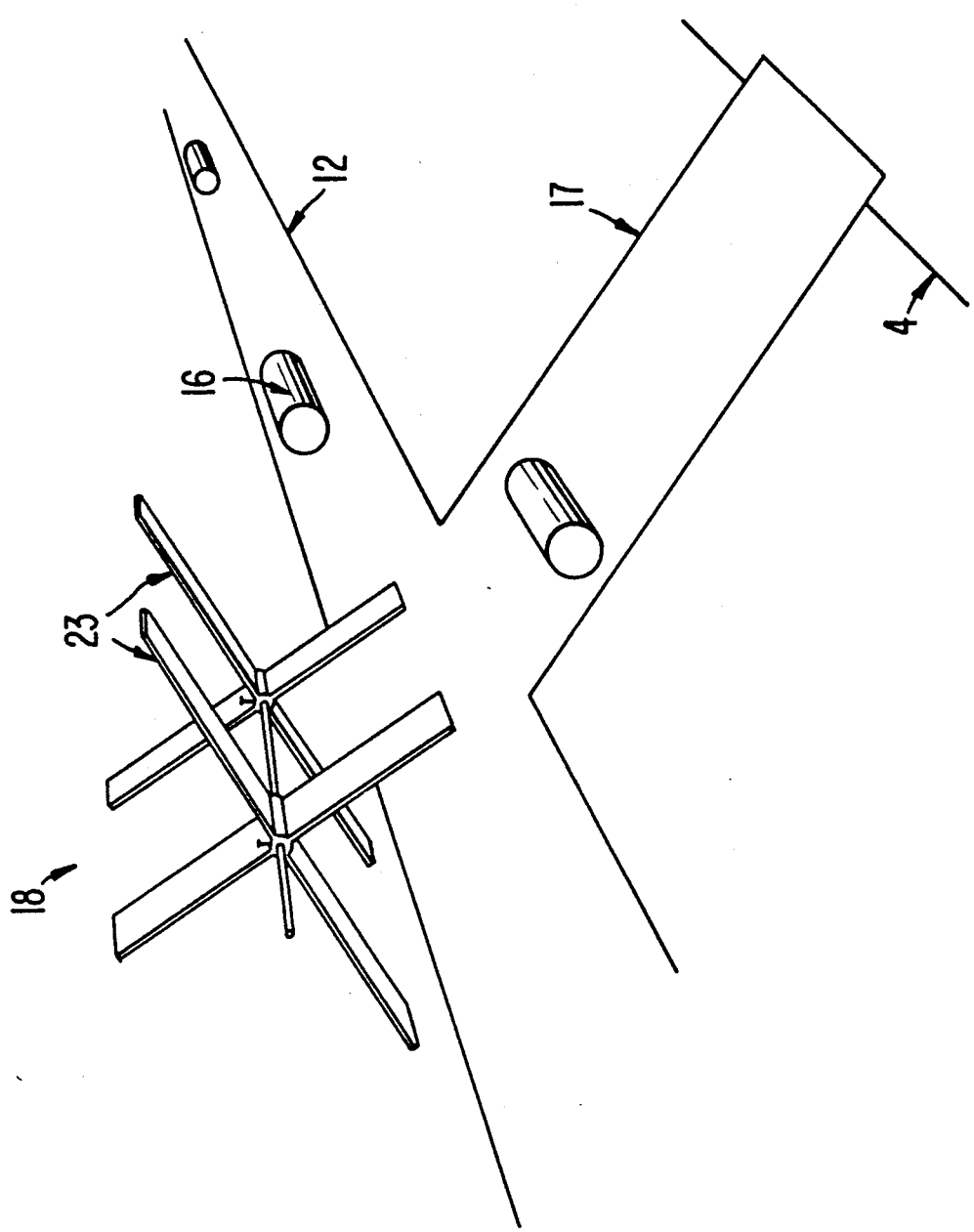
FIG. 7 is a view similar to FIG. 5 but of a modification thereof.

FIG. 7 illustrates a modification of the apparatus of FIG. 6 wherein the radial arms extending from wheel-like member 18 each are formed by plural members 23 spaced along the axis. Such spacing is intended to be adjustable to accommodate cops of varying lengths. The spacing between the members 23 is slightly narrower than the length of the cop. This embodiment has the advantage of reducing the total inertia of the apparatus 18.

As discussed above, the sensors 21, 22 are capable of detecting the presence of a moving cop at a given position along conveyor 12. As also discussed above, the spacing between adjacent cops will vary somewhat randomly, and the cops are supplied at a high rate. It therefore is apparent that the apparatus 18 undergoes a continuous sequence of start, rotation and stop commands that can be issued at very high rates of up to several hundred cops per minute. In order to eliminate all possible wasted motion or movement that might be encountered when using a traditional driving mechanism, as well as to eliminate unavoidable time losses that would be experienced when using a motor to be stopped and started each time a cop is detected by the sensor, a further valuable feature of the driving system of the present invention involves the use of a motor that runs continuously and that is connected intermittently to the rotating shaft of apparatus 18 through a clutch-and-brake assembly of a type that per se is known in the art. In this manner it is possible to take synergistic advantage both of the low inertia characteristics of the arms 19 or 23 (which however will rotate and stop at a very high rate) and the peculiarities of a continuously running motor coupled to a servocontrolled clutch-and-brake assembly. Thus, such an assembly acts as a rotary stepping actuator and allows for very quick and frequent coupling and uncoupling sequences that are intended to control only low inertia loads.

FIGS. 8–12 illustrate alternative embodiments of the handling apparatus of the present invention wherein there is employed at least one belt installed on pairs of coplanar wheels rotating synchronously around different parallel axes to achieve ejection of cops 16 from conveyor 12.

Figures 8, 9:
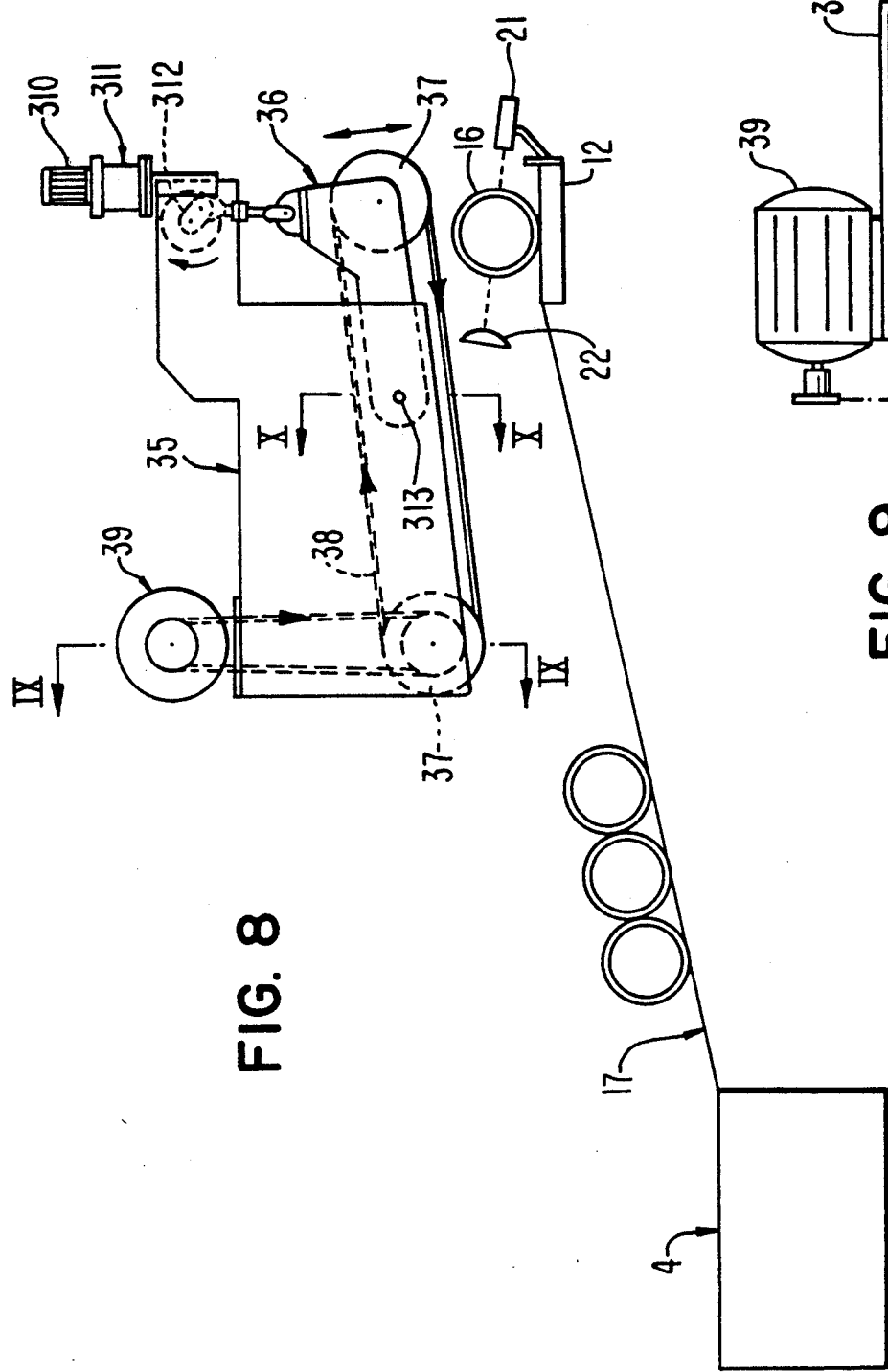
FIG. 8 is a schematic side view of another embodiment of an apparatus according to the present invention.
FIG. 9 is a schematic sectional view taken along line IX—IX in FIG. 8.
Figure 10:
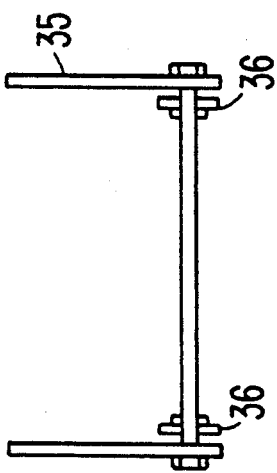
FIG. 10 is a schematic cross sectional view taken along line X—X in FIG. 8.
Figure 11:
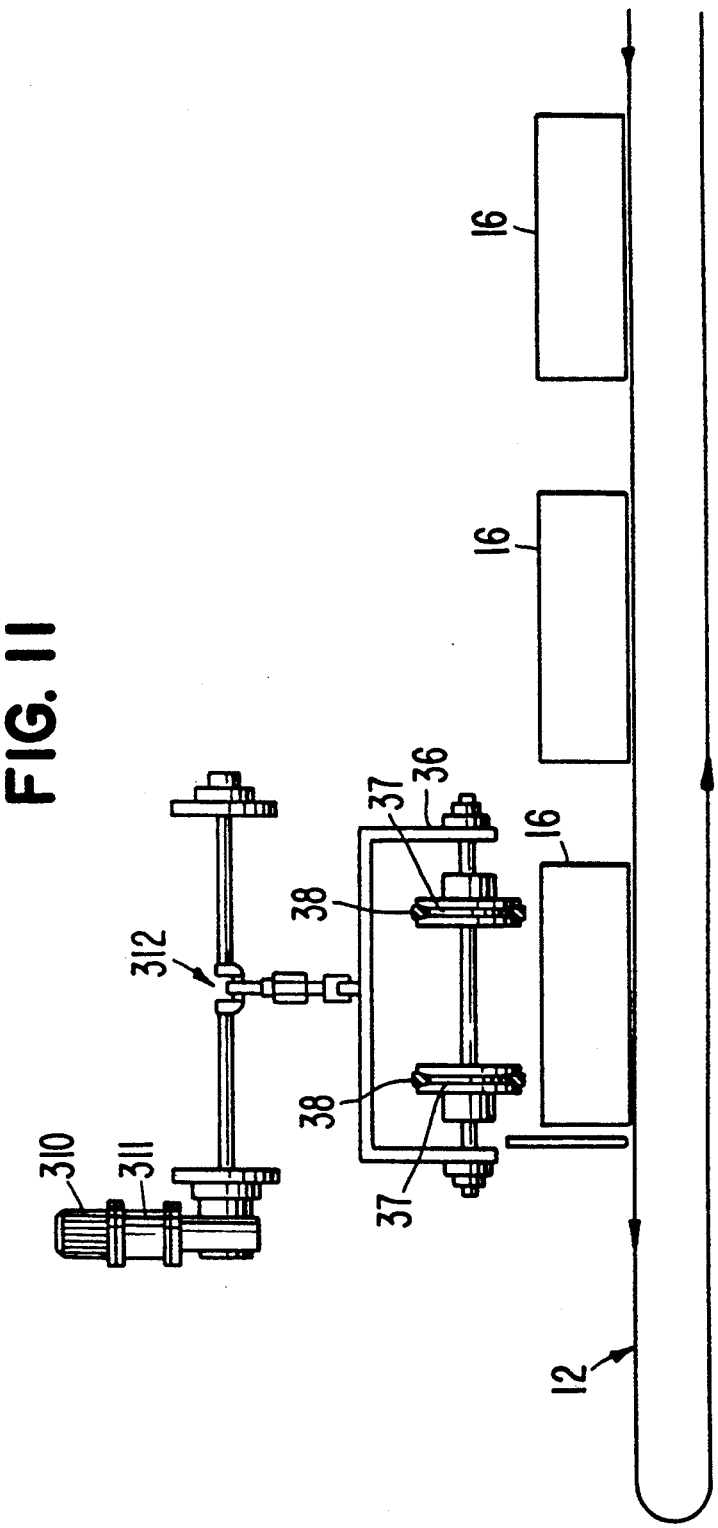
FIG. 11 is an end view of the apparatus shown in FIG. 8.

Thus, as shown in FIG. 8, a fixed fame 35 has pivoted thereto at axle 313 a movable frame 36. One shaft is mounted on fixed frame 35 and supports two wheels 37 (FIG. 9), and a second, parallel shaft is mounted on movable frame 36 and supports two other wheels 37. The wheels on the two shafts extend coplanar, and around, e.g., pulleys 37' of respective pairs of wheels 37 on the two shafts pass belts 38. A motor 39 mounted on frame 35 drives wheels 37 mounted on frame 35, for example by belts. As a result, belts 38 are rotated parallel to each other and synchronously by the wheels on frames 35, 36. The planes of belts 38 extend vertically and substantially transverse to the direction of movement of cops on conveyor 12. Frame 36 is reciprocally movable toward and away from conveyor 12 such that when frame 36 moves vertically downwardly toward conveyor 12 belts 38 press against a cop 16 moving along conveyor 12 and eject such cop toward ramp 17 and machine 4. Immediately thereafter, frame 36 reciprocates vertically upwardly to enable the next cop to move into position. Thus, the handling apparatus of this embodiment employs a continuous sequence of up and down displacement commands at a very high rate of up to several hundred strokes per minute, while belts 38 continuously rotate. The reciprocating displacement of frame 36 cannot be achieved by a conventional pnuematic system since, as discussed above, such a system has disadvantages involving inertia and slowness of operation. Therefore, the use of such a known pneumatic system would impair the efficiency of output and the economical effectiveness of the present invention.

Accordingly, in accordance with the present invention there is provided a motor 310 mounted on frame 35 and operable through a mechanical clutch-and-brake assembly 311, and possibly a reduction gear and motion converting gear 312, to move frame 36 upwardly and downwardly in a reciprocating manner at a high rate of speed. Thus, the elements 311, 312 may be any known mechanical structure capable of converting rotary motion of an output shaft of motor 310 into reciprocal longitudinal movement of an element connected to frame 36. Such devices are well known. Sensors 21, 22 detect the presence of a cop at the location of the handling apparatus on conveyor 12. This detection signal actuates assembly 311 to connect the output shaft of motor 310, which operates continuously, with motion converting mechanism 312 connected to frame 36. Mechanism 312, for example a gear, converts the rotary fixed axis motion of motor 310 into a reciprocating, rectilinear motion. Again, this may be achieved by known structures, such as a system of plurally lobed cams, a crank gear, etc. In this manner, frame 36 has imparted thereto a reciprocating essentially vertical motion fast enough to comply with the demands of the speed of movement of the cops. When frame 36 moves downwardly, the two belts 38 move into contact with the cop 16, and since the belts are rotating in synchronism they displace cop 16 from conveyor 12 onto ramp 17. Immediately thereafter, assembly 311 is controlled to cause frame 36 to move vertically upwardly to allow the next cop to move forwarding to reach a position beneath frame 36. When sensor 21, 22 detects the presence of such next cop beneath frame 36, it will send a new signal to assembly 311, and the above process will be repeated. This process will be repeated as further cops are supplied by conveyor 12. If the manufacturing rate in the upstream machines of the production line is increased, then the rate of the cops moving along conveyor 12 also increases. Therefore, the rapidity at which the cops must be ejected from conveyor 12 and delivered to the downstream machines also must be increased, and this is possible in accordance with the above described construction.

In accordance with a useful feature of the present invention, if two or more cops are too close to each other or even in contact when being moved by conveyor 12, it becomes possible to regulate the movement of frame 36 in a manner such as to cause frame 36 to be maintained in its upper position such that those cops that are too close together may pass beyond frame 36 and eventually be collected, for example in a recovery chamber at the end of the conveyor. For such a purpose, further sensors (for example 315a, 315b shown in FIG. 12) can be located before or upstream of the position of frame 36, i.e. upstream of sensor 21, 22. This additional sensor can be controlled by suitably programmed logic to, upon the detection of the occurrence of such an irregular supply of cops, maintain frame 36 in its upward position.

Figure 12:
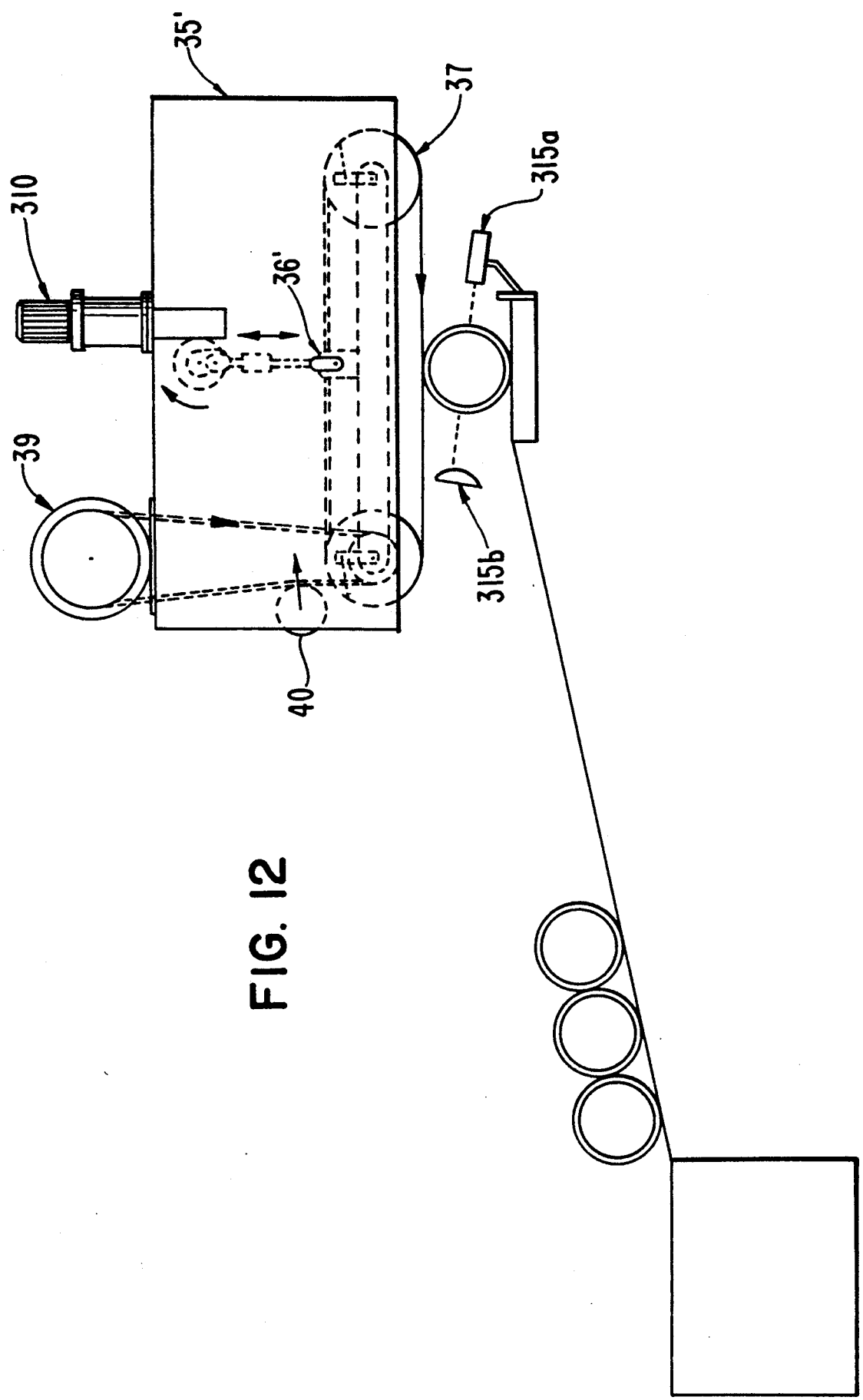
FIG. 12 is a view similar to FIG. 8 but of a modified embodiment of the apparatus thereof.

FIG. 12 illustrates a modification of the embodiment of FIGS. 8–11. In this embodiment, the movable frame 36' is mounted in fixed frame 35' in a manner to be moved in a vertical translational motion. Thus, the hinge 313 of the embodiment of FIG. 8 is unnecessary.

The movement of the entire frame 36' in a vertical reciprocating manner is guided, for example by at least one slot and pin arrangement. Both pairs of wheels are mounted on frame 36'. Continuous rotary motion to wheels 37 can be transmitted from motor 39 through various known techniques, for example through belts or chains provided with automatic slack take-up devices 40, or through a system of Cardan joints or through a system of sliding gears, etc. The system of the embodiment of FIGS. 12 otherwise operates in the manner discussed above regarding the embodiment of FIGS. 8–11.

The above handling apparatuses of FIGS. 4–12 are efficient and reliable with respect to their capability of high rate of operation in discharging a great number of cops from the conveyor. The operation of such embodiments however could be improved if it could be guaranteed that each cop would be at a precisely controlled position and orientation when the handling apparatus (the arms of FIGS. 4–7 or the belts of FIGS. 8–12) are activated to contact each cop. This would ensure that each cop is discharged in a totally balanced manner and will eject into the ramp 17 in a precisely controlled orientation and position. It furthermore is necessary that each arm of the embodiment of FIGS. 4–7, after having ejected a given cop, be moved to a position such that the next cop has a clear path between arms of the handling apparatus. It therefore would be advantageous to be able to provide such perfect synchronism of the speed of the handling apparatus with the speed of the moving cops. This however is complicated due to the fact that the spacing between adjacent cops normally will vary over a rather wide range. Control systems for achieving such synchronization of course are known, but such known systems are very sophisticated, complex and thus expensive.

Figure 13:
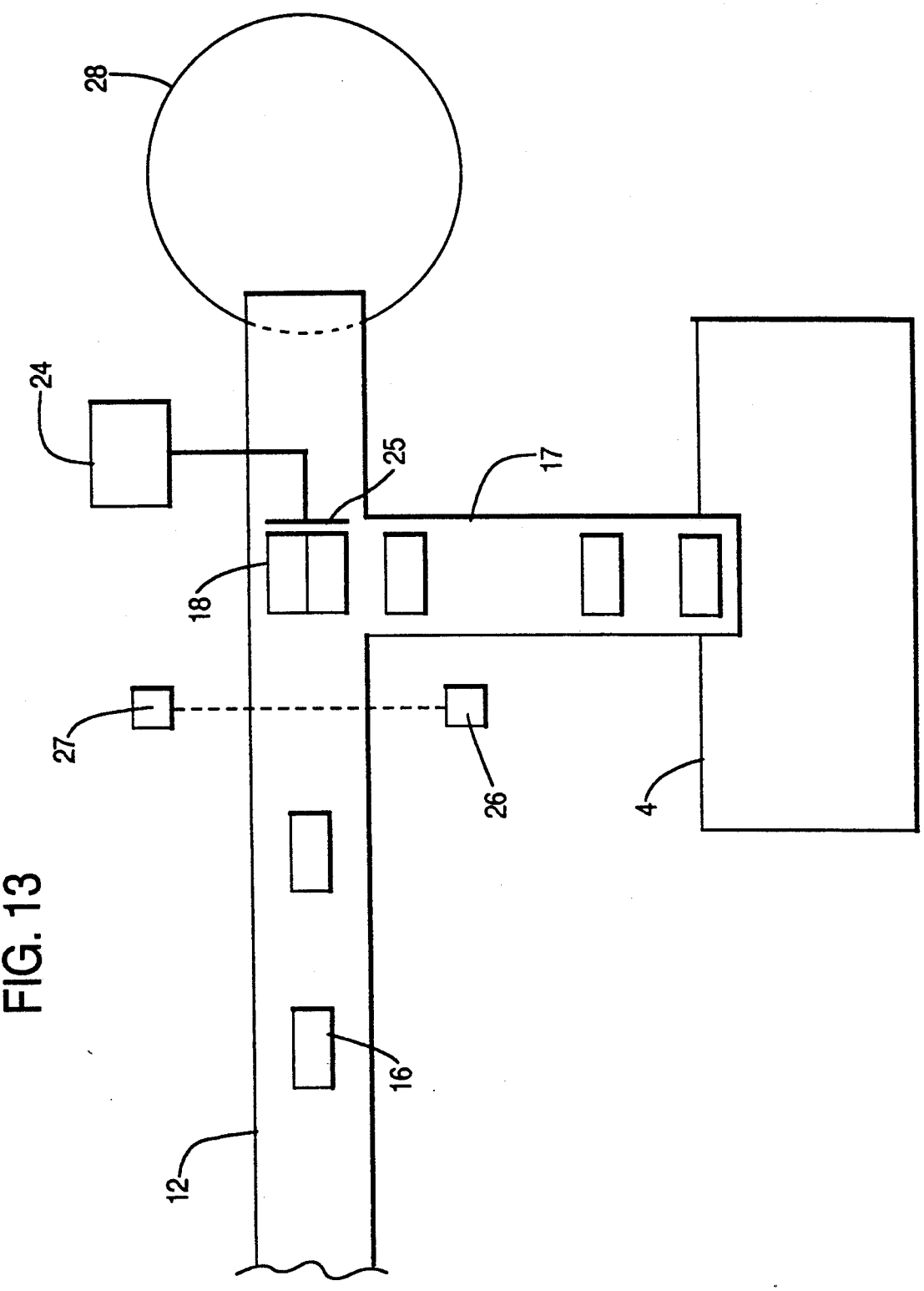
FIG. 13 is a schematic plan view of an apparatus incorporating a further feature of the present invention.
Figure 14:
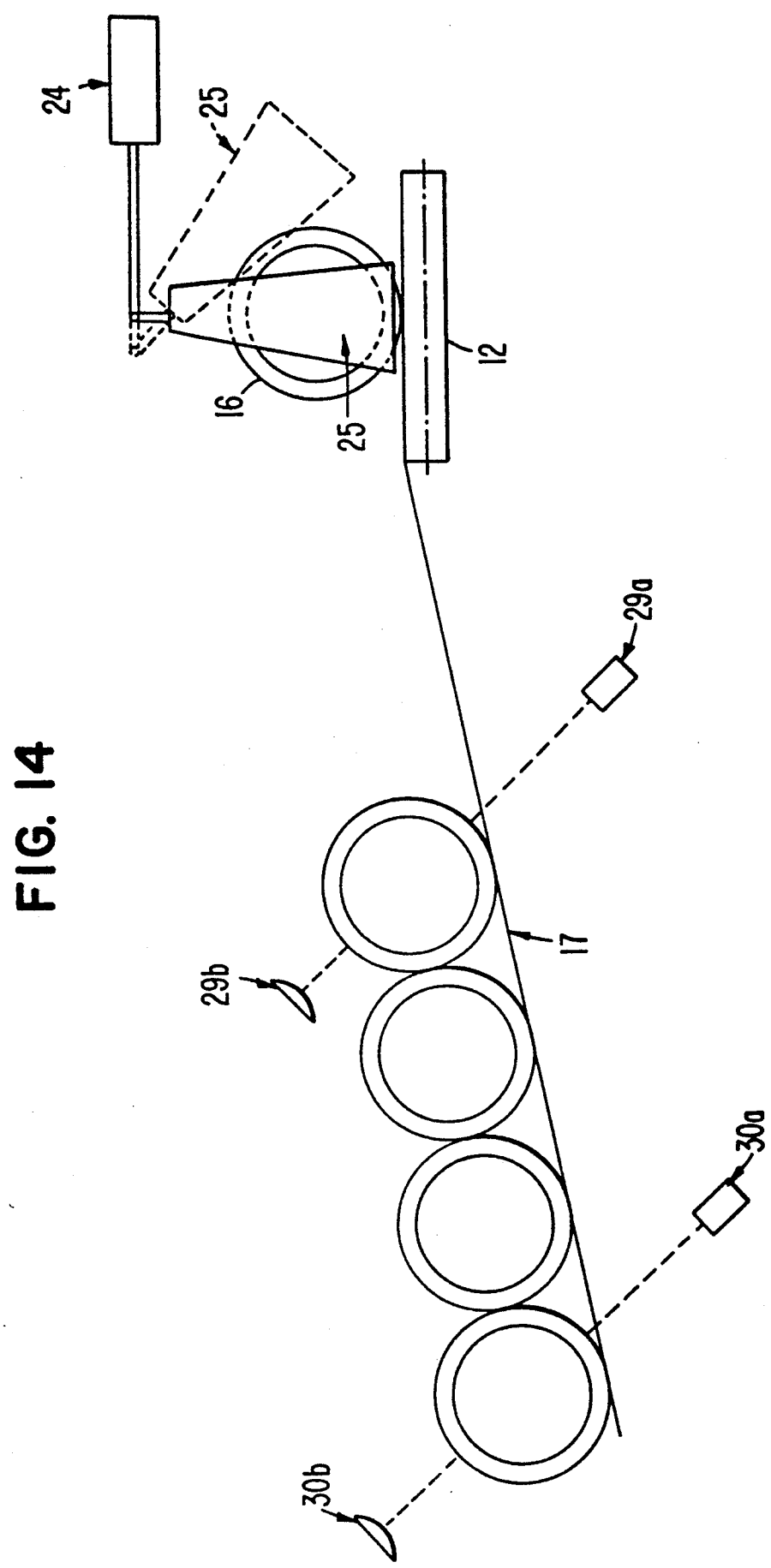
FIG. 14 is a schematic side view thereof.

In accordance with a further feature of the present invention, illustrated in FIGS. 13 and 14, it is possible to achieve such synchronization. Thus, mounted immediately downstream of handling apparatus 18 is a stopping mechanism for very briefly stopping movement of cops 16 on conveyor 12 at a position such that handling apparatus 18 then may move cops 16 from the conveyor to the ramp 17 at a precisely controlled position and orientation. Particularly, a obstacle, for example a paddle-like member 25 is movable by a motor 24 into and out of the path of cops 16 being conveyed by conveyor 12. Thus, member 25 acts as a type of gate to obstruct the passage of a cop so that when apparatus 18 is activated to eject the cop from the conveyor this will be done at a precise orientation and alignment of the cop, and this orientation and alignment will be the same for all cops.

Operation of motor 24 may be controlled by sensors 29a, 29b and 30a, 30b respectively detecting a saturated condition and an empty condition of ramp 17. When a copy reaches member 25, then based on the signal from the sensors 29a, 29b and 30a, 30b, member 25 either will be open to allow continued movement of such cop beyond that intermediate station (when ramp 17 is full or saturated) or will move to stop such cop (when ramp 17 is not full or saturated). This control however may be achieved by any other signal or command from any other type of sensor. When the signal is that the ramp 17 is saturated or full, then gate or member 25 allows the cops to continue movement beyond the respective intermediate station to another intermediate station or to a recovery container 28 at the end of the conveyor.

Thereafter, when the ramp 17 is not full, a signal will be sent to control mechanism 24 to cause member 25 to obstruct the path of the next cop. All further cops then sequentially will be stopped by member 25 and immediately thereafter will be ejected by the apparatus 18 until that particular ramp is detected as being full.

It therefore is apparent that a complete stop and shift cycle of each cop must take place within the time span from the passage of one copy to the passage of the next cop. It is easier, less complex and less expensive to push a cop that is standing still rather than to intercept with great precision and synchronism a rapidly moving sequence of cops at an irregular spacing but always moving at a high speed.

A further feature of the present invention provides that the stopping means may be in the form of a wheel having extending therefrom a plurality of blades or members 25, such that the wheel may rotate in a continuous direction. The paddles form obstacles for sequentially supplied cops, and adjacent paddle-like members 25 are spaced by a distance sufficient to allow passage therebetween of a cop. This modification provides the advantage that the wheel can be made to rotate at a high speed and therefore is able to achieve its function of blocking or unblocking the passage of the cops at a rate which is much faster than that achieved by a device including a single obstacle.

In order to eliminate all dead times and stresses that inevitably would result from a practically uninterrupted sequence of up to several hundred cycles per minute of rotation start and stop commands, and also in order to eliminate inevitable speed problems that would arise if a motor were to be repeatedly started and stopped each time a cop is handled, the motor 24 may be continuously operated and the output shaft thereof may be connected to member 25 by a clutch-and-brake assembly that thereby would act as a rotary stepping actuator. It thereby would be possible to actuate the stopping apparatus in the same manner as the handling apparatus 18 discussed previously.

In accordance with an advantageous feature of the present invention it is possible to avoid two or more cops that are not sufficiently spaced from being stopped. If such were to occur, then the apparatus 18 would push the first cop toward the ramp, and would result in undesirable friction between such cop and the subsequent cop. This not only would damage both cops but would also cause the second cop to be pushed from the conveyor and to fall outside ramp 17. In accordance with the present invention it is possible to avoid such a situation by providing that the sensor system be arranged to enable it to appropriately detect the presence of two successive cops being too close together or even in contact on conveyor 12. In such a case, the sensor system would send a signal to member 25 for it to remain open and to allow such two contiguous cops to pass through the intermediate station and to be collected in container 28 at the end of the conveyor.

In further accordance with the present invention it is possible to automatically detect any irregular conditions occurring along conveyor 12 and to dispose of such irregular conditions automatically. For example, it may occur that an off-cut scrap is produced by the cutting-to-length machine and is not duly separated from a cop. This would result in such scrap being delivered to conveyor 12 together with the cops. In such case, sensors 26, 27 (FIG. 13) would detect the presence of such condition and would command apparatus 25 to remain open to allow such scrap and/or cops to pass beyond the respective intermediate section and to be discharged into container 28. This would not impair the regular and overall operation of the plant since it would not be necessary to shut down the plant.

Although the present invention has been described and illustrated with respect to preferred features thereof, it is to be understood that various changes and modifications may be made to the various described and illustrated features of the various embodiments of the present invention without departing from the scope of the invention. It particularly is to be understood that whereas the above discussion primarily was directed to discharge of cops to a trimming machine, it equally is possible to discharge the cops to a cartoning or packaging station. It also is contemplated that the present invention may be useful for the production and/or treatment of articles other than cops.

I claim:

1. In a system for the production or treatment of articles wherein the articles are transported between an upstream station and a downstream station and wherein the speed of the articles from the upstream station is greater than the speed of operation of the downstream station, said system comprising means for the production of cylindrical cops by a winding step to form a tube-like shape, a cutting step to cut the tube-like shape to form tubes, a drying step to dry the thus cut tubes, a cutting-to-length step to cut the tubes to selected lengths, and a final trimming step to result in the cops, the improvement comprising:

a plurality of said downstream stations; and
    articles distributing means, located between said upstream station and said plurality of downstream stations, and operable to distribute the articles to any of said plurality of downstream stations, for selectively distributing the articles to said plurality of downstream stations as a function of operating conditions thereof.

2. The improvement claimed in claim 1, wherein said distributing means is operable to distribute the articles selectively to said downstream stations as a function of the degree of accumulation of the articles in said downstream stations.

3. The improvement claimed in claim 2, wherein said distributing means comprises means for distributing said articles to a selected downstream station until said selected downstream station has reached its capacity for acceptance of the articles, and then for interrupting the supply of articles to said selected downstream station and for distributing the articles to another said downstream station.

4. The improvement claimed in claim 1, wherein said plurality of downstream stations are provided at respective positions spaced along a conveyor extending from said upstream station, said distributing means comprises a plurality of handling means located at respective intermediate stations along said conveyor at said respective positions of said plurality of downstream stations, each said handling means is operable to move a given article from said conveyor at the respective said intermediate station to the respective said downstream station or to allow a given article at said respective intermediate station to be moved by said conveyor downstream beyond said respective intermediate station.

5. The improvement claimed in claim 4, wherein each said handling means comprises a frame mounted above said conveyor for reciprocating movement toward and away therefrom, and at least one moving member mounted on said frame such that, upon said frame moving toward said conveyor said moving member contacts an article and transfers such article toward the respective said downstream station.

6. The improvement claimed in claim 1, wherein said upstream station comprises means for performing said cutting-to-length step, and said downstream stations comprise a plurality of trimming machines to perform said final trimming step.

7. The improvement claimed in claim 1, wherein said system further comprises means for performing a packaging step for packaging the cops, said upstream station comprises a trimming machine for performing said final trimming step, and said downstream stations comprise a plurality of stations for performing said packaging step.

8. The improvement claimed in claim 1, wherein said plurality of downstream stations are arranged in an array extending radially about said distributing system, and said distributing means is movable to align with a selected of said downstream stations.

9. The improvement claimed in claim 5, wherein said frame is supported by a fixed frame and is movable relative thereto.

10. The improvement claimed in claim 4, further comprising, at each said intermediate station, a respective means for stopping movement of an article on said conveyor at a position such that the respective said handling means then may move such article from said conveyor to said respective downstream station.

11. The improvement claimed in claim 10, wherein said stopping means comprises an obstacle movable into and out of the path of articles being conveyed by said conveyor.

12. In a system for the production or treatment of articles wherein the articles are transported between an upstream station and a downstream station and wherein the speed of the articles from the upstream station is greater than the speed of operation of the downstream station, the improvement comprising:
a plurality of said downstream stations; and
article distributing means, located between said upstream station and said plurality of downstream stations, and operable to distribute the articles to any of said plurality of downstream stations, for selectively distributing the articles to said plurality of downstream stations as a function of different treatments to be performed on the articles by different of said downstream stations.

13. In a system for the production or treatment of articles wherein the articles are transported between an upstream station and a downstream station and wherein the speed of the articles from the upstream station is greater than the speed of operation of the downstream station, the improvement comprising:
a plurality of said downstream stations provided at respective positions spaced along a conveyor extending from said upstream station; and
article distributing means, located between said upstream station and said plurality of downstream stations, and operable to distribute the articles to any of said plurality of downstream stations, for selectively distributing the articles to said plurality of downstream stations as a function of operating conditions thereof, said distributing means comprising a plurality of handling means located at respective intermediate stations along said conveyor at said respective positions of said plurality of downstream stations, each said handling means being operable to move a given article from said conveyor at the respective said intermediate station to the respective said downstream station or to allow a given article at said respective intermediate station to be moved by said conveyor downstream beyond said respective intermediate station, each said handling means comprising a wheel-like member located above said conveyor and rotatable about an axis extending substantially parallel to the direction of conveyance of said conveyor, said wheel-like member having a plurality of outwardly extending arms dimensioned to, upon rotation of said wheel-like member about said axis, intercept articles on said conveyor and transfer such articles toward the respective said downstream station while avoiding contact with said conveyor.

14. The improvement claimed in claim 13, wherein said arms extending radially outwardly from said axis.

15. The improvement claimed in claim 13, wherein adjacent said arms are spaced circumferentially about said axis by a distance to allow passage therebetween of an article conveyed by said conveyor.

16. The improvement claimed in claim 13, wherein each said arm is formed by plural members spaced along said axis.

17. The improvement claimed in claim 16, wherein the spacing along said axis by said members is adjustable.

18. The improvement claimed in claim 13, further comprising a continuously operating motor, and means for intermittently connecting the output of said motor to said wheel-like member to cause intermittent rotation thereof.

19. The improvement claimed in claim 18, further comprising detecting means, operably connected to said connecting means, for detecting the presence of an article at the respective said intermediate station and for operating said connecting means to achieve rotation of said wheel-like member upon such detection.

20. In a system for the production or treatment of articles wherein the articles are transported between an upstream station and a downstream station and wherein the speed of the articles from the upstream station is greater than the speed of operation of the downstream station, the improvement comprising:
a plurality of said downstream stations;
article distributing means, located between said upstream station and said plurality of downstream stations, and operable to distribute the articles to any of said plurality of downstream stations, for selectively distributing the articles to said plurality of downstream stations as a function of operating conditions thereof;
said plurality of downstream stations being arranged in an array extending radially about said distributing system; and
said distributing means comprising a handling means pivotable about an upstream first end thereof to align a downstream second end thereof with the said selected downstream station.

21. The improvement claimed in claim 20, wherein said handling means comprises a chute-like member.

22. The improvement claimed in claim 20, wherein said handling means comprises a conveyor.

23. In a system for the production or treatment of articles wherein the articles are transported between an upstream station and a downstream station and wherein the speed of the articles from the upstream station is greater than the speed of operation of the downstream station, the improvement comprising:

a plurality of said downstream stations provided at respective positions spaced along a conveyor extending from said upstream station; and article distributing means, located between said upstream station and said plurality of downstream stations, and operable to distribute the articles to any of said plurality of downstream stations, for selectively distributing the articles to said plurality of downstream stations as a function of operating conditions thereof, said distributing means comprising a plurality of handling means located at respective intermediate stations along said conveyor at said respective positions of said plurality of downstream stations, each said handling means being operable to move a given article from said conveyor at the respective said intermediate station to the respective said downstream station or to allow a given article at said respective intermediate station to be moved by said conveyor downstream beyond said respective intermediate station, each said handling means comprising a frame mounted above said conveyor for reciprocating movement toward and away therefrom, and at least one moving member mounted on said frame such that, upon said frame moving toward said conveyor said moving member contacts an article and transfers such article toward the respective said downstream station, said frame being pivoted to a fixed frame for movement relative thereto in a vertical plane.

24. In a system for the production or treatment of articles wherein the articles are transported between an upstream station and a downstream station and wherein the speed of the articles from the upstream station is greater than the speed of operation of the downstream station, the improvement comprising:

a plurality of said downstream stations provided at respective positions spaced along a conveyor extending from said upstream station; and article distributing means, located between said upstream station and said plurality of downstream stations, and operable to distribute the articles to any of said plurality of downstream stations, for selectively distributing the articles to said plurality of downstream stations as a function of operating conditions thereof, said distributing means comprising a plurality of handling means located at respective intermediate stations along said conveyor at said respective positions of said plurality of downstream stations, each said handling means being operable to move a given article from said conveyor at the respective said intermediate station to the respective said downstream station or to allow a given article at said respective intermediate station to be moved by said conveyor downstream beyond said respective intermediate station, each said handling means comprising a frame mounted above said conveyor for reciprocating movement toward and away therefrom, and at least one moving member mounted on said frame such that, upon said frame moving toward said conveyor said moving member contacts an article and transfers such article toward the respective said downstream station, said frame being guided for vertical sliding movement relative to a fixed frame by at least one guide arrangement.

25. In a system for the production or treatment of articles wherein the articles are transported between an upstream station and a downstream station and wherein the speed of the articles from the upstream station is greater than the speed of operation of the downstream station, the improvement comprising:

a plurality of said downstream stations provided at respective positions spaced along a conveyor extending from said upstream station; and article distributing means, located between said upstream station and said plurality of downstream stations, and operable to distribute the articles to any of said plurality of downstream stations, for selectively distributing the articles to said plurality of downstream stations as a function of operating conditions thereof, said distributing means comprising a plurality of handling means located at respective intermediate stations along said conveyor at said respective positions of said plurality of downstream stations, each said handling means being operable to move a given article from said conveyor at the respective said intermediate station to the respective said downstream station or to allow a given article at said respective intermediate station to be moved by said conveyor downstream beyond said respective intermediate station, each said handling means comprising a frame mounted above said conveyor for reciprocating movement toward and away therefrom, at least one moving member mounted on said frame such that, upon said frame moving toward said conveyor said moving member contacts an article and transfers such article toward the respective said downstream station, said frame being supported by a fixed frame and being movable relative thereto, and means mounted on said fixed frame, for imparting to said frame reciprocal movement toward and away from said conveyor.

26. The improvement claimed in claim 25, wherein said movement imparting means comprises a continuously operating motor mounted on said fixed frame and having a continually rotating output shaft, and means connected to said frame and in operable engagement with said output shaft for intermittently converting rotation of said output shaft into reciprocal movement of said frame.

27. The improvement claimed in claim 26, further comprising detecting means, operably connected to said converting means, for detecting the presence of an article at the respective said intermediate station and for operating said converting means to achieve reciprocal movement of said frame upon such detection.

28. The improvement claimed in claim 26, wherein said converting means comprises a crank, a cam or an eccentric arrangement.

29. In a system for the production or treatment of articles wherein the articles are transported between an upstream station and a downstream station and wherein the speed of the articles from the upstream station is greater than the speed of operation of the downstream station, the improvement comprising:

a plurality of said downstream station provided at respective positions spaced along a conveyor extending from said upstream station; and article distributing means, located between said upstream station and said plurality of downstream stations, and operable to distribute the articles to any of said plurality of downstream stations, for selectively distributing the articles to aid plurality of downstream stations as a function of operating conditions thereof, said distributing means comprising a plurality of handling means located at respective intermediate stations along said conveyor at said respective positions of said plurality of downstream stations, each said handling means being operable to move a give article from said conveyor at the respective said intermediate station to the respective said downstream station or to allow a given article at said respective intermediate station to be moved by said conveyor downstream beyond said respective intermediate station, each said handling means comprising a frame mounted above said conveyor for reciprocating movement toward and away therefrom, at least one moving member mounted on said frame such that, upon said frame moving toward said conveyor said moving member contacts an article and transfers such article toward the respective said downstream station, said moving member comprising wheel means mounted about at least one shaft supported by said frame, belt means fitted around said wheel means, and means for moving said belt means.

30. The improvement claimed in claim 29, comprising two parallel said shafts at least one of which is supported by said frame, two wheels mounted on each shaft, and two bolts mounted about respective said wheels on each of said shafts.

31. In a system for the production or treatment of articles wherein the articles are transported between an upstream station and a downstream station and wherein the speed of the articles from the upstream station is greater than the speed of operation of the downstream station, the improvement comprising:
a plurality of said downstream stations provided at respective positions spaced along a conveyor extending from said upstream station; and
article distributing means, located between said upstream station and said plurality of downstream stations, and operable to distribute the articles to any of said plurality of downstream stations, for selectively distributing the articles to said plurality of downstream stations as a function of operating conditions thereof, said distributing means comprising a plurality of handling means located at respective intermediate stations along said conveyor at said respective positions of said plurality of downstream stations, each said handling means being operable to move a given article from said conveyor at the respective said intermediate station to the respective said downstream station or to allow a given article at said respective intermediate station to be moved by said conveyor downstream beyond said respective intermediate station, each said handling means comprising a frame mounted above said conveyor for reciprocating movement toward and away therefrom, at least one moving member mounted on said frame such that, upon said frame moving toward said conveyor said moving member contacts an article and transfer such article toward the respective said downstream station, said frame being supported by a fixed frame and being movable relative thereto, and a motive source mounted on said fixed frame and operably connected to said moving member for imparting movement thereto.

32. An apparatus, for use in a process involving the production or treatment of articles wherein the articles are transported between an upstream station and a downstream station, wherein the speed of supply of the articles from the upstream station is greater than the speed of operation of the downstream station, and wherein there are provided a plurality of the downstream stations to be located at respective positions spaced along a conveyor extending from the upstream station, said apparatus comprising:
means to be located between the upstream station and the plurality of downstream stations, and operable to distribute the articles to any of the plurality of downstream stations, for selectively distributing the articles to the plurality of downstream stations as a function of operating conditions thereof, said means comprising handling means to be located at respective intermediate stations along the conveyor at respective positions of the plurality of downstream stations, each said handling means including means to move a given article from the conveyor at the respective intermediate station to the respective downstream station or to allow a given article at the respective intermediate station to be moved by the conveyor downstream beyond the respective intermediate station, each said handling means comprising a frame to be mounted above the conveyor for reciprocating movement toward and away therefrom, said at least one moving member mounted on said frame such that, upon said frame moving toward the conveyor said moving member contacts an article and transfers such article toward the respective downstream station, said frame being pivoted to a fixed frame for movement relative thereto in a vertical plane.

33. In a system for the production or treatment of articles wherein the articles are transported between an upstream station and a downstream station and wherein the speed of the articles from the upstream station is greater than the speed of the operation of the downstream station, the improvement comprising:
a plurality of said downstream stations provided at respective positions spaced along a conveyor extending from said upstream station;
article distributing means, located between said upstream station and said plurality of downstream stations, and operable to distribute the articles to any of said plurality of downstream stations, for selectively distributing the articles to said plurality of downstream stations as a function of operating conditions thereof, said distributing means comprising a plurality of handling means located at respective intermediate stations along aid conveyor at said respective positions of said plurality of downstream stations, each said handling means being operable to move a given article from said conveyor at the respective said intermediate station to the respective said downstream station or to allow a given article at said respective intermediate station to be moved by said conveyor downstream beyond said respective intermediate station; and
at each said intermediate station, a respective means for stopping movement of an article on said conveyor at a position such that the respective said handling means then may move such article from said conveyor to said respective downstream station, said stopping means comprising a wheel having at least one paddle capable of blocking the path of an article being conveyed by said conveyor.

34. The improvement claimed in claim 33, comprising plural said paddles spaced by a distance sufficient to allow passage therebetween of an article being conveyed by said conveyor.

35. In a system for the production or treatment of articles wherein the articles are transported between an upstream station and a downstream station and wherein the speed of the articles from the upstream station is greater than the speed of operation of the downstream station, the improvement comprising:

a plurality of said downstream stations provided at respective positions spaced along a conveyor extending from said upstream station;

article distributing means, located between said upstream station and said plurality of downstream stations, and operable to distribute the articles to any of said plurality of downstream stations, for selectively distributing the articles to said plurality of downstream stations as a function of operating conditions thereof, said distributing means comprising a plurality of handling means located at respective intermediate stations along said conveyor at said respective positions of said plurality of downstream stations, each said handling means being operable to move a given article from said conveyor at the respective said intermediate station to the respective said downstreaem station or to allow a given articles at said respective intermediate station to be moved by said conveyor downstream beyond said respective intermediate station; and at each said intermediate station, a respective means for stopping movement of an article on said conveyor at a position such that the respective said handling means then may move such article from said conveyor to said respective downstream station, a continuously operating motor, and means for intermittently connecting the output of said motor to said stopping means to cause said stopping means to block movement of an article on said conveyor.

36. The improvement claimed in claim 35, further comprising detecting means, operably connected to said connecting means, for detecting the relative number of articles at the respective said downstream station, and for controlling the operation of said connecting means as a function of such detection.

37. The improvement claimed in claim 35, further comprising detecting means, operatively connected to said connecting means, for detecting the presence of articles positioned too close to each other on said conveyor, and for preventing said stopping means from blocking such articles as a function of such detection.

38. An apparatus, for use in a process involving the production or treatment of articles wherein the articles are transported between an upstream station and a downstream station, wherein the speed of supply of the articles from the upstream station is greater than the speed of operation of the downstream station, and wherein there are provided a plurality of the downstream stations arranged in a radial array, said apparatus comprising:

means to be located between the upstream station and the plurality of downstream stations, and operable to distribute the articles to any of the plurality of downstream stations, for selectively distributing the articles to the plurality of downstream stations as a function of operating conditions thereof, said means comprising a distributing system to align with a selected of the downstream stations arranged in the radial array, said distributing systems comprising a handling means pivotable about an upstream first end thereof to align a downstream second end thereof with a selected downstream station.

39. An apparatus as claimed in claim 38, wherein said handling means comprises a chute-like member.

40. An apparatus as claimed in claim 38, wherein said handling means comprises a conveyor.

41. In a process involving the production or treatment of articles wherein said articles are transported between an upstream station and a downstream station and wherein the speed of supply of said articles from said upstream station is greater than the speed of operation of said downstream station, the improvement comprising:

providing a plurality of said downstream stations;

providing between said upstream station and said plurality of downstream stations an article distributing system operable to distribute said articles to any of said plurality of downstream stations, with said plurality of downstream stations being in an array arranged radially about said distributing system, said distributing means comprising a handling means pivotable about an upstream first end thereof to align a downstream second end thereof with the said selected downstream station; and operating said distributing system to selectively distribute said articles to said plurality of downstream stations as a function of operating conditions thereof, said operating comprising pivoting said handling means about said upstream first end thereof to align said downstream second end thereof with a selected of said downstream stations.

42. The improvement claimed in claim 41, wherein said handling means comprises a chute-like member.

43. The improvement claimed in claim 41, wherein said handling means comprises a conveyor.

44. An apparatus, for use in a process involving the production or treatment of articles wherein the articles are transported between an upstream station and a downstream station, whereby the speed of supply of the articles from the upstream station is greater than the speed of operation of the downstream station, and wherein there are provided a plurality of the downstream stations to be located at respective positions spaced along a conveyor extending from the upstream station, said apparatus comprising:

means to be located between the upstream station and the plurality of downstream stations, and operable to distribute the articles to any of the plurality of downstream stations, for selectively distributing the articles to the plurality of downstream stations as a function of operating conditions thereof, said means comprising handling means to be located at respective intermediate stations along the conveyor at respective positions of the plurality of downstream stations, each said handling means including means to move a given article from the conveyor at the respective intermediate station to the respective downstream station or to allow a given article at the respective intermediate station to be moved by the conveyor downstream beyond the respective intermediate station, said handling means comprising a wheel-like member to be located above the conveyor and rotatable about an axis to extend substantially parallel to the direction of conveyance of the conveyor, said wheel-like member having a plurality of outwardly extending arms dimensioned to, upon rotation of said wheel-like member about said axis, intercept articles on the conveyor and transfer such articles toward the respective downstream station while avoiding contact with the conveyor.

45. An apparatus as claimed in claim 44, wherein said arms extend radially outwardly from said axis.

46. An apparatus as claimed in claim 44, wherein adjacent said arms are spaced circumferentially about said axis by a distance to allow passage therebetween of an article conveyed by the conveyor.

47. An apparatus as claimed in claim 44, wherein said arm is formed by plural members spaced along said axis.

48. An apparatus as claimed in claim 47, wherein the spacing along said axis by said members is adjustable.

49. An apparatus as claimed in claim 44, further comprising a continuously operating motor, and means for intermittently connecting the output of said motor to said wheel-like member to cause intermittent rotation thereof.

50. An apparatus as claimed in claim 49, further comprising detecting means, operably connected to said connecting means for detecting the presence of an article at the respective intermediate station and for operating said connecting means to achieve rotation of said wheel-like member upon such detection.

51. In a process involving the production or treatment of cylindrically shaped articles wherein said articles are transported between an upstream station and a downstream station and wherein the speed of supply of said articles from said upstream station is greater than the speed of operation of said downstream station, the improvement comprising:
providing a plurality of said downstream stations;
providing between said upstream station and said plurality of downstream stations an article distributing system operable to distribute said articles to any of said plurality of downstream stations; and
operating said distributing system to selectively distribute said articles to said plurality of downstream stations as a function of operating conditions thereof.

52. The improvement claimed in claim 51, comprising operating said distributing system to distribute said articles selectively to said downstream stations as a function of the degree of accumulation of said articles in said downstream stations.

53. The improvement claimed in claim 52, comprising distributing said articles to a selected said downstream station until said selected downstream station has reached its capacity for acceptance of said articles, and then operating said distributing system to interrupt the supply of said articles to said selected downstream station and to distribute said articles to another said downstream station.

54. The improvement claimed in claim 51, wherein said articles are cylindrical support cops.

55. The improvement claimed in claim 54, wherein said process comprises the production of said cops by a winding step to form a tube-like shape, a cutting step to cut said tube-like shape to form tubes, a drying step to dry the thus cut tubes, a cutting-to-length step to cut said tubes to selected lengths, and a final trimming step to result in said cops.

56. The improvement claimed in claim 55, wherein said upstream station comprises means for performing said cutting-to-length step, and said downstream stations comprise a plurality of trimming machines to perform said final trimming step.

57. The improvement claimed in claim 55, wherein said process further comprises a packaging step for packaging said cops, said upstream station comprises a trimming machine for performing said final trimming step, and said downstream stations comprise a plurality of stations for performing said packaging step.

58. The improvement claimed in claim 51, comprising providing said plurality of downstream stations in an array arranged radially about said distributing system, and said operating comprises moving said distributing system to align with a selected of said downstream stations.

59. The improvement claimed in claim 51, comprising providing said plurality of downstream stations at respective positions spaced along a conveyor extending from said upstream station, wherein said distributing system comprises handling means located at respective intermediate stations along said conveyor at said respective positions of said plurality of downstream stations, and said operating comprises causing each said handling means to move a given said article from said conveyor at the receptive said intermediate station to the respective said downstream or to allow a given said article at said respective intermediate station to be moved by said conveyor downstream beyond said respective intermediate station.

60. An apparatus, for use in a process involving the production or treatment of articles wherein the articles are transported between an upstream station and a downstream station, wherein the speed of supply of the articles from the upstream station is greater than the speed of operation of the downstream station, and wherein there are provided a plurality of the downstream stations to be located at respective positions spaced along a conveyor extending from the upstream station, said apparatus comprising:
means to be located between the upstream station and the plurality of downstream stations, and operable to distribute the articles to any of the plurality of downstream stations, for selectively distributing the articles to the plurality of downstream stations as a function of operating conditions thereof, said means comprising handling means to be located at respective intermediate stations along the conveyor at respective positions of the plurality of downstream stations, each said handling means including means to move a given article from the conveyor at the respective intermediate station to the respective downstream station or to allow a given article at the respective intermediate station to be moved by the conveyor downstream beyond the respective intermediate station, each said handling means comprising a frame to be mounted above the conveyor for reciprocating movement toward and away therefrom, said at least one moving member mounted on said frame such that, upon said frame moving toward the conveyor said moving member contacts an article and transfers such article toward the respective downstream station, said moving member comprising wheel means mounted about at least one shaft supported by said frame, belt means fitted around said wheel means, and means for moving said belt means.

61. An apparatus as claimed in claim 60, comprising two parallel said shafts at least one of which is supported by said frame, two wheels mounted one each said shaft, and two belts mounted about respective said wheels on each of said shafts.

62. An apparatus, for use in a process involving the production or treatment of articles wherein the articles are transported between an upstream station and a downstream station, wherein the speed of supply of the articles from the upstream station is greater than the speed of operation of the downstream station, and wherein there are provided a plurality of the downstream stations to be located at respective positions spaced along a conveyor extending from the upstream station, said apparatus comprising:

means to be located between the upstream station and the plurality of downstream stations, and operable to distribute the articles to any of the plurality of downstream stations, for selectively distributing the articles to the plurality of downstream stations as a function of operating conditions thereof, said means comprising handling means to be located at respective intermediate stations along the conveyor at respective positions of the plurality of downstream stations, each said handling means including means to move a given article from the conveyor at the respective intermediate station to the respective downstream station or to allow a given article at the respective intermediate station to be moved by the conveyor downstream beyond the respective intermediate station, each said handling means comprising a frame to be mounted above the conveyor for reciprocating movement toward and away therefrom, said at least one moving member mounted on said frame such that, upon said frame moving toward the conveyor said moving member contacts an article and transfers such article toward the respective downstream station, said frame being supported by a fixed frame and being movable relative thereto, and a motive source mounted on said fixed frame and operably connected to said moving member for imparting movement thereto.

63. In a process involving the production or treatment of articles wherein said articles are transported between an upstream station and a downstream station and wherein the speed of supply of said articles from said upstream station is greater than the speed of operation of said downstream station, the improvement comprising:

providing a plurality of said downstream stations;
providing between said upstream station and said plurality of downstream stations an article distributing system operable to distribute said articles to any of said plurality of downstream stations; and
operating said distributing system to selectively distribute said articles to said plurality of downstream stations as a function of different treatments to be performed on said articles by different said downstream stations.

64. An apparatus, for use in a process involving the production or treatment of articles wherein the articles are transported between an upstream station and a downstream station, wherein the speed of supply of the articles from the upstream station is greater than the speed of operation of the downstream station, and wherein there are provided a plurality of the downstream stations to be located at respective positions spaced along a conveyor extending from the upstream station, said apparatus comprising:

means to be located between the upstream station and the plurality of downstream stations, and operable to distribute the articles to any of the plurality of downstream stations, for selectively distributing the articles to the plurality of downstream stations as a function of operating conditions thereof, said means comprising handling means to be located at respective intermediate stations along the conveyor at respective positions of the plurality of downstream stations, each said handling means including means to move a given article from the conveyor at the respective intermediate station to the respective downstream station or to allow a given article at the respective intermediate station to be moved by the conveyor downstream beyond the respective intermediate station; and means, for location at each intermediate station, for stopping movement of an article on the conveyor at a position such that the respective said handling means then may move such article from the conveyor to the respective downstream station, said stopping means comprising a wheel having at least one paddle capable of blocking the path of an article being conveyed by the conveyor.

65. An apparatus as claimed in claim 64, comprising plural said paddle spaced by a distance sufficient to allow passage therebetween of an article being conveyed by the conveyor.

66. An apparatus, for use in a process involving the production or treatment of articles wherein the articles are transported between an upstream station and a downstream station, wherein the speed of supply of the articles from the upstream station is greater than the speed of operation of the downstream station, and wherein there are provided a plurality of the downstream stations to be located at respective positions spaced along a conveyor extending from the upstream station, said apparatus comprising:

means to be located between the upstream station and the plurality of downstream stations, and operable to distribute the articles to any of the plurality of downstream stations, for selectively distributing the articles to the plurality of downstream stations as a function of operating conditions thereof, said means comprising handling means to be located at respective intermediate stations along the conveyor at respective positions of the plurality of downstream stations, each said handling means including means to move a given article from the conveyor at the respective intermediate station to the respective downstream station or to allow a given article at the respective intermediate station to be moved by the conveyor downstream beyond the respective intermediate station; and means, for location at each intermediate station, for stopping movement of an article on the conveyor at a position such that the respective said handling means then may move such article from the conveyor to the respective downstream station, a continuously operating motor, and means for intermittently connecting the output of said motor to said stopping means to cause said stopping means to block movement of an article on the conveyor.

67. An apparatus as claimed in claim 66, further comprising detecting means, operably connected to said connecting means, for detecting the relative number of articles at the respective downstream station, and for controlling the operation of said connecting means as a function of such detection.

68. An apparatus as claimed in clam 66, further comprising detecting means, operatively connected to said connecting means, for detecting the presence of articles positioned too close to each other on the conveyor, and for preventing said stopping means from blocking such article as a function of detection.

69. An apparatus, for use in a process involving the production or treatment of articles wherein the articles are transported between an upstream station and a downstream station, wherein the speed of supply of the articles from the upstream station is greater than the speed of operation of the downstream station, and wherein there are provided a plurality of the downstream stations to be located at respective positions spaced along a conveyor extending from the upstream station, said apparatus comprising:

means to be located between the upstream station and the plurality of downstream stations, and operable to distribute the articles to any of the plurality of downstream stations, for selectively distributing the articles to the plurality of downstream stations as a function of operating conditions thereof, said means comprising handling means to be located at respective intermediate stations along the conveyor at respective positions of the plurality of downstream stations, each said handling means including means to move a given article from the conveyor at the respective intermediate station to the respective downstream station or to allow a given article at the respective intermediate station to be moved by the conveyor downstream beyond the respective intermediate station, each said handling means comprising a frame to be mounted above the conveyor for reciprocating movement toward and away therefrom, said at least one moving member mounted on said frame such that, upon said frame moving toward the conveyor said moving member contacts an article and transfers such article toward the respective downstream station, said frame being supported by a fixed frame and being movable relative thereto, and means, mounted on said fixed frame, for imparting to said frame reciprocal movement to be toward and away from the conveyor.

70. An apparatus as claimed in claim 69, wherein said movement comprising means comprises a continuously operating motor mounted on said fixed frame and having a continually rotating output shaft, and means connected to said frame an in operable engagement with said output shaft for intermittently converting rotation of said output shaft into reciprocal movement of said frame.

71. An apparatus as claimed in claim 70, further comprising detecting means, operably connected to said converting means, for detecting the presence of an article at the respective intermediate station and for operating said converting means to achieve reciprocal movement of said frame upon such detection.

72. An apparatus as claimed in claim 70, wherein said converting means comprises a crank, a cam or an eccentric arrangement.

73. An apparatus, for use in a process involving the production or treatment of articles wherein the articles are transported between an upstream station and a downstream station, wherein the speed of supply of the articles from the upstream station is greater than the speed of operation of the downstream station, sand wherein there are provided a plurality of the downstream stations to be located at respective positions spaced along a conveyor extending from the upstream station, said apparatus comprising:

means to be located between the upstream station and the plurality of downstream stations, and operable to distribute the articles to any of the plurality of downstream stations, for selectively distributing the articles to the plurality of downstream stations as a function of operating conditions thereof, said means comprising handling means to be located at respective intermediate stations along the conveyor at respective positions of the plurality of downstream stations, each said handling means including means to move a given article from the conveyor at the respective intermediate station to the respective downstream station or to allow a given article at the respective intermediate station to be moved by the conveyor downstream beyond the respective intermediate station, each said handling means comprising a frame to be mounted above the conveyor for reciprocating movement toward and away therefrom, said at least one moving member mounted on said frame such that, upon said frame moving toward the conveyor said moving member contacts an article and transfers such article toward the respective downstream station, said frame being guided for vertical sliding movement relative to a fixed frame by at least one guide arrangement.

* * * * *